United States Patent
Bacon

(10) Patent No.: US 12,255,372 B2
(45) Date of Patent: Mar. 18, 2025

(54) METHODS AND CIRCUITS FOR STABLE HOT SWITCHING OF ANTENNAS

(71) Applicant: Murata Manufacturing Co., Ltd., Kyoto (JP)

(72) Inventor: Peter Bacon, Derry, NH (US)

(73) Assignee: Murata Manufacturing Co., Ltd., Nagaokakyo (JP)

( * ) Notice: Subject to any disclaimer, the term of this patent is extended or adjusted under 35 U.S.C. 154(b) by 342 days.

(21) Appl. No.: 17/889,827

(22) Filed: Aug. 17, 2022

(65) Prior Publication Data

US 2023/0091678 A1 Mar. 23, 2023

Related U.S. Application Data

(60) Provisional application No. 63/244,462, filed on Sep. 15, 2021.

(51) Int. Cl.
| | | |
|---|---|---|
| *H01P 1/10* | (2006.01) | |
| *H01P 1/15* | (2006.01) | |
| *H01Q 3/24* | (2006.01) | |
| *H04B 1/00* | (2006.01) | |
| *H04B 1/44* | (2006.01) | |

(52) U.S. Cl.
CPC .............. *H01P 1/10* (2013.01); *H01P 1/15* (2013.01); *H01Q 3/24* (2013.01); *H04B 1/0064* (2013.01); *H04B 1/44* (2013.01)

(58) Field of Classification Search
CPC ..................... H01P 1/10; H01P 1/15
USPC ........................................... 333/101
See application file for complete search history.

(56) References Cited

U.S. PATENT DOCUMENTS

| | | | | |
|---|---|---|---|---|
| 4,810,911 A | * | 3/1989 | Noguchi ............. | H03K 17/693 327/431 |
| 6,310,508 B1 | * | 10/2001 | Westerman ........... | H03K 17/74 333/81 R |
| 2004/0182686 A1 | * | 9/2004 | Takasu ..................... | H01P 1/15 200/42.01 |

(Continued)

FOREIGN PATENT DOCUMENTS

EP 2999125 3/2016

OTHER PUBLICATIONS

Bacon, et al., "Overview of RF Switch Technology and Applications", Microwave Journal, Jul. 15, 2014.

(Continued)

*Primary Examiner* — Benny T Lee
(74) *Attorney, Agent, or Firm* — Steinfl + Bruno LLP

(57) ABSTRACT

Circuits and methods that enable stable and reliable "hot switching" from one antenna to another without turning RF power to the antennas OFF in wireless RF systems during at least some transmission events. One embodiment comprises an RF switch circuit including a common port configured to pass an RF signal, a plurality of switch arms each coupled to the common port and including an associated port, and a shunt termination impedance selectively couplable to the common port through a switch. Another embodiment comprises a method for switching an RF signal applied to a common port of a switch from a first switch arm initially in an ON state to a second switch arm initially in an OFF state, including: setting the second switch arm to the ON state, and then setting the first switch arm to the OFF state.

15 Claims, 17 Drawing Sheets

(56) References Cited

U.S. PATENT DOCUMENTS

2004/0183623 A1* 9/2004 Geller et al. .............. H01P 1/15
　　　　　　　　　　　　　　　　　　　　333/103
2017/0230049 A1　 8/2017　Shapiro et al.

OTHER PUBLICATIONS

Patrovsky, Andreas, International Search Report and Written Opinion received from the EPO dated Jan. 4, 2023 for appln. No. PCT/US2022/076224, 15 pgs.

* cited by examiner

METHODS AND CIRCUITS FOR STABLE HOT SWITCHING OF ANTENNAS

CROSS-REFERENCE TO RELATED APPLICATION

The present application claims priority to the following provisional patent application, assigned to the assignee of the present invention, the contents of which are incorporated by reference: U.S. Provisional Patent Application Ser. No. 63/244,462, filed Sep. 15, 2021, entitled "Methods and Circuits for Stable Hot Switching of Antennas".

BACKGROUND

(1) Technical Field

This invention relates to electronic circuits, and more particularly to radio frequency electronic circuits and related methods.

(2) Background

Many modern electronic systems include radio frequency (RF) transceivers; examples include cellular telephones, personal computers, tablet computers, wireless network components, televisions, cable system "set top" boxes, automobile communication systems, wireless sensing devices, and radar systems. Many RF transceivers are capable of transmitting and receiving in duplex or half-duplex modes across multiple frequencies in multiple bands; for instance, in the United States, the 2.4 GHz band is divided into 14 channels spaced about 5 MHz apart. As another example, a modern "smart telephone" may include RF transceiver circuitry capable of concurrently operating on different cellular communications systems (e.g., GSM, CDMA, LTE, and 5G in multiple bands within the 600-6000 MHz range), on different wireless network frequencies and protocols (e.g., various IEEE 802.11"WiFi" protocols at 2.4 GHz, 5 GHz, and 6 GHz), and on "personal" area networks (e.g., Bluetooth based systems).

A frequency division duplex radio system operates in one radio frequency (RF) band for transmitting RF signals and a separate RF band for receiving RF signals. A time division duplex radio system operates in a single RF band and frequently switches between transmitting or receiving RF signals in the single band. An RF band typically spans a range of frequencies (e.g., 10 to 100 MHz per band), and actual signal transmission and reception may be in sub-bands or channels of such bands, which may overlap. Alternatively, two widely spaced RF bands may be used for signal transmission and reception, respectively.

More advanced radio systems, such as some cellular telephone systems, may be operable over multiple RF bands for signal transmission and reception. Such multi-band operation allows a single radio system to be interoperable with different international frequency allocations and signal coding systems (e.g., 5G, LTE, CDMA, GSM).

Some advanced radio systems use multiple-input, multiple-output (MIMO) technology to multiply the capacity of a radio link by using multiple transmission and receiving antennas to exploit multipath propagation. The same MIMO architecture may be used to improve the signal-to-noise ratio (SNR) of a radio link rather than its capacity.

To accommodate multiple frequencies and multiple protocols (particularly MIMO), a system component (e.g., a user's cell phone, sometimes known as "User Equipment" or UE) may include multiple antennas.

Some radio systems, such as the 5G NR (for "5th Generation, New Radio") and 4G LTE (for "4th Generation, Long Term Evolution") cellular telephone systems defined by the 3rd Generation Partnership Project (3GPP, a well-known industry standard setting organization), require sophisticated data structures with precise timing constraints. In some cases, particular operations by a system component (e.g., a user's cell phone) require switching between multiple antennas. Conventionally, when switching between antennas, RF power is turned OFF while the signal paths to the antennas are changed—so called "cold switching". For example, in the case of 5G NR and 4G LTE UE's, a time interval of 15 µs is required between signal transmissions when switching antennas. In a hand-held cell phone, such a time interval means that battery power may be wasted during the gaps as there are no signal transmissions or transmission events. Any power dissipated in circuits remaining active during the cold switching gap is wasted. In addition, with no signal transmissions events occurring during the gap, the total network throughput is negatively impacted by cold switching gaps.

Accordingly, it would be useful to enable stable and reliable "hot switching" from one antenna to another (i.e., switching antennas without turning RF power to the antennas OFF) during at least some transmission events.

SUMMARY

The present invention encompasses circuits and methods that enable stable and reliable "hot switching" from one antenna to another (i.e., switching antennas without turning RF power to the antennas OFF) in wireless RF systems during at least some transmission events. Embodiments of the invention are particularly useful in 5G NR and 4G LTE cellular telephone systems but may also be used in other types of wireless RF systems.

One embodiment comprises an RF switch circuit including a common port configured to pass an RF signal, a plurality of switch arms each coupled to the common port and including an associated port, and a shunt termination impedance selectively couplable to the common port through a switch. The shunt termination impedance is coupled by the switch to the common port (1) before a first switch arm transitions from an ON state to an OFF state while a second switch arm is in the OFF state, (2) while the first switch arm transitions to the OFF state while the second switch arm is in the OFF state, and (3) while the second switch arm transitions from the OFF state to the ON state while the first switch arm is in the OFF state.

Another embodiment comprises a method for switching an RF signal applied to an common port of a switch circuit from a first switch arm initially in an ON state to a second switch arm initially in an OFF state, including: setting the second switch arm to the ON state, and then setting the first switch arm to the OFF state.

The details of one or more embodiments of the invention are set forth in the accompanying drawings and the description below. Other features, objects, and advantages of the invention will be apparent from the description and drawings, and from the claims.

DESCRIPTION OF THE DRAWINGS

Like reference numbers and designations in the various drawings indicate like elements.

DETAILED DESCRIPTION

The present invention encompasses circuits and methods that enable stable and reliable "hot switching" from one antenna to another (i.e., switching antennas without turning RF power to the antennas OFF) in wireless RF systems during at least some transmission events. Embodiments of the invention are particularly useful in 5G NR and 4G LTE cellular telephone systems but may also be used in other types of wireless RF systems.

Common RF Front End Configurations

Figure 1:
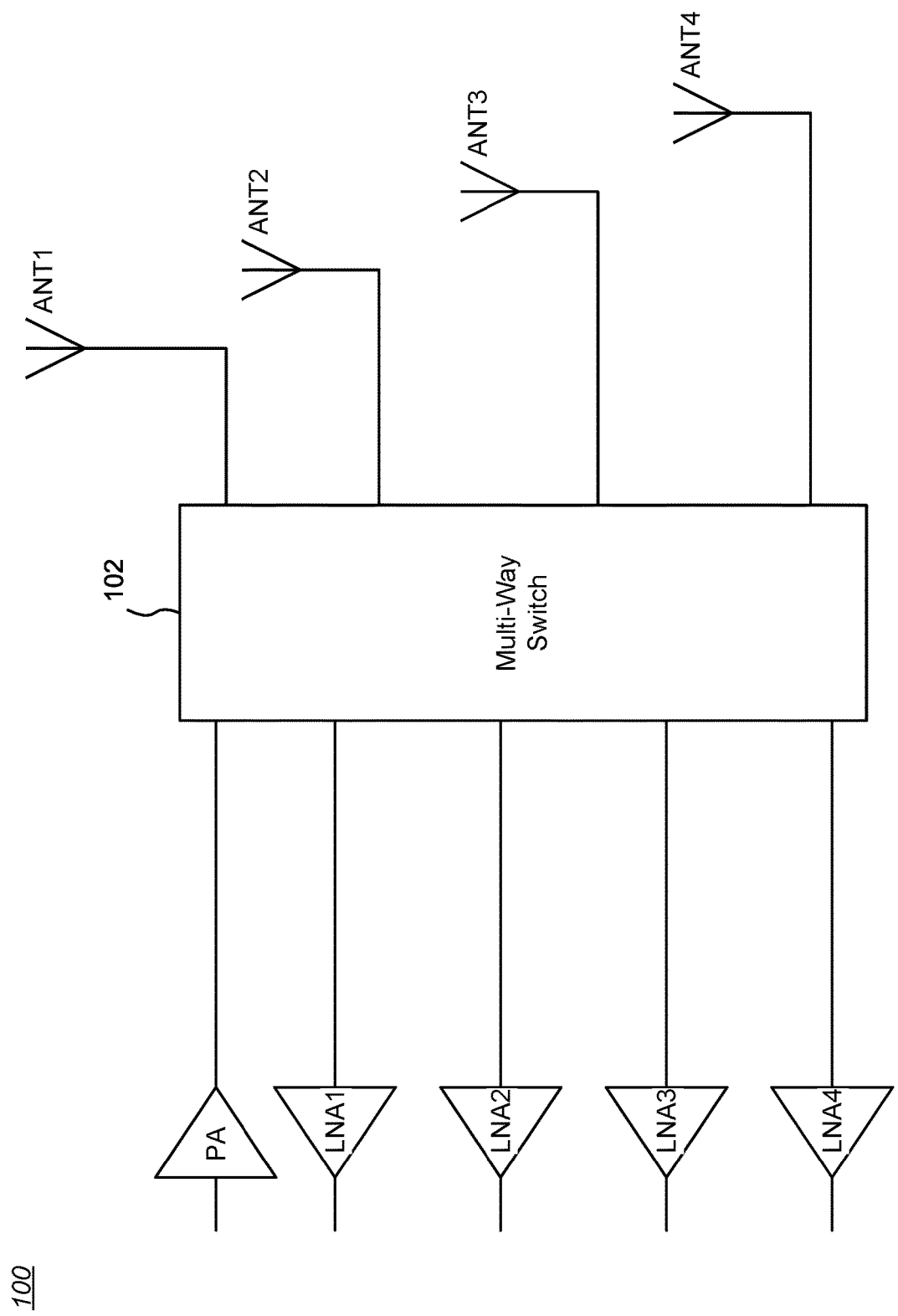
FIG. 1 is a block diagram of an RF transceiver front end in a single transmitter, four receiver (1T4R) configuration.

FIG. 1 is a block diagram of an RF transceiver front end 100 in a single transmitter, four receiver (1T4R) configuration. A multi-way switch 102 is coupled to multiple antennas (four, in this example: ANT1, ANT2, ANT3, and ANT4), to a power amplifier PA, and to multiple low-noise amplifiers (four, in this example: LNA1, LNA2, LNA3, and LNA4). The multi-way switch 102 is configured to allow connection of any amplifier (PA or LNA) to any antenna, thus allowing both transmission of RF signals and reception of RF signals. In some embodiments, the multi-way switch 102 may include circuitry that functions to separate transmitted and received signals, such as duplexers.

In some integrated circuit (IC) embodiments, all of the amplifiers and the switch 102 may be fabricated on a single IC die. In other IC embodiments, the amplifiers and the switch 102 may be fabricated on a two or more IC dies. For example, the PA, LNA1, LNA2, and a first portion of the switch 102 may be fabricated on a first IC die, while LNA3, LNA4, and a second portion of the switch 102 may be fabricated on a second IC die.

Figure 2:
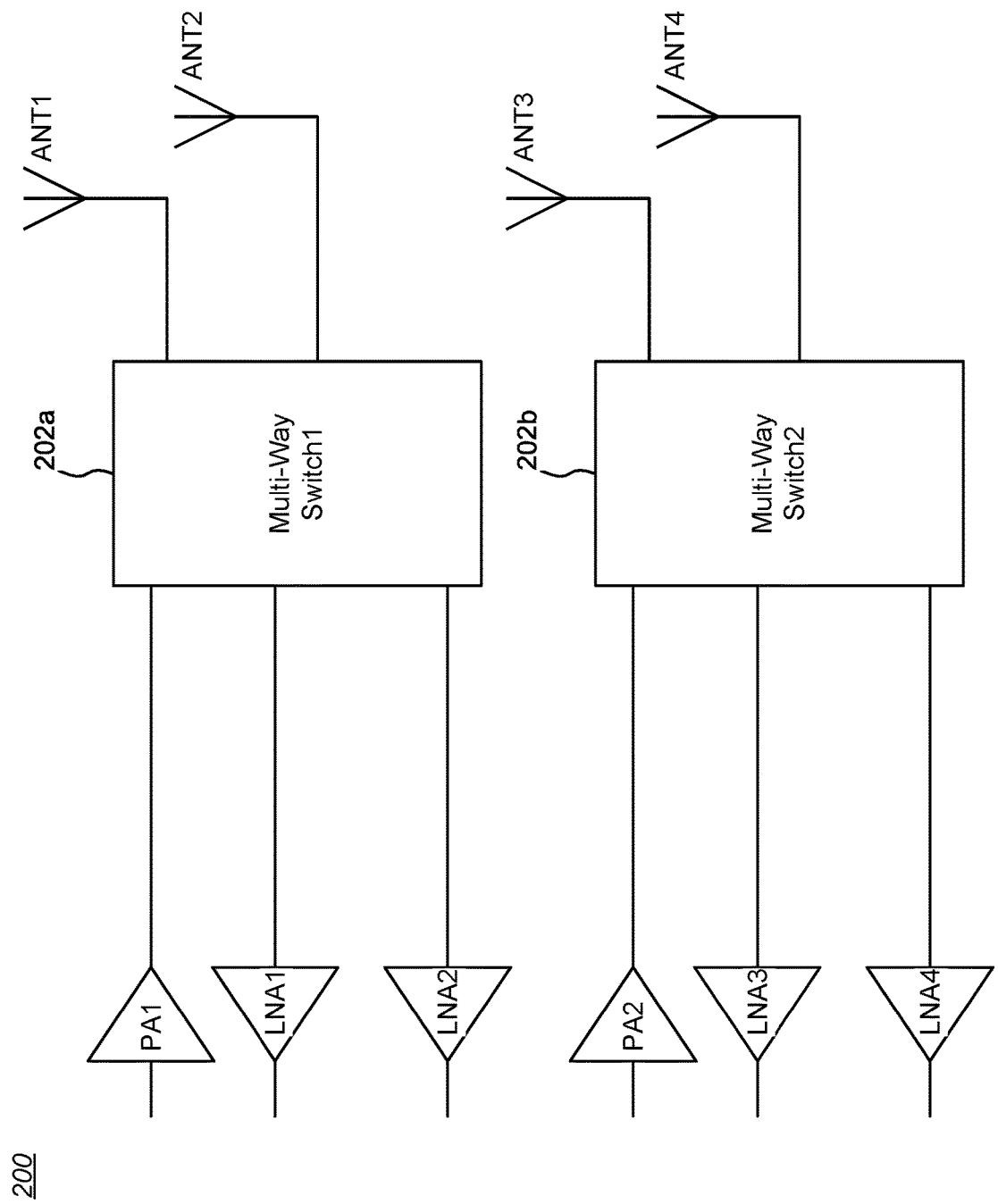
FIG. 2 is a block diagram of an RF transceiver front end in a two transmitter, four receiver (2T4R) configuration.

FIG. 2 is a block diagram of an RF transceiver front end 200 in a two transmitter, four receiver (2T4R) configuration. A first multi-way switch1 202a is coupled to multiple antennas (two, in this example) ANT1, ANT2, to a first power amplifier PA1, and to multiple low-noise amplifiers (two, in this example) LNA1, LNA2. A second multi-way switch2 202b is also coupled to multiple antennas (two, in this example) ANT3, ANT4, to a second power amplifier PA2, and to multiple low-noise amplifiers (two, in this example) LNA3, LNA4. The multi-way switches 202a, 202b are configured to allow connection of any associated amplifier to any associated antenna, thus allowing both transmission of RF signals and reception of RF signals. In some embodiments, the multi-way switches 202a, 202b may include circuitry that functions to separate transmitted and received signals, such as duplexers. The allocation of the amplifiers and the multi-way switches to one or more IC dies is a matter of design choice.

Sounding Reference Signals

Some radio systems utilize one or more reference signals to provide information about the quality of a channel. For example, in the 5G NR and 4G LTE cellular telephone systems, a Sounding Reference Signal (SRS) transmission may be used to make smart decisions for resource allocation for downlink transmission, link adaptation, and to decode transmitted data from User Equipment (UE). An SRS transmission may be sequentially transmitted by UE (e.g., a cell phone) through multiple different antennas to a network component, such as a base station (e.g., a "gNB" under 5G NR terminology), and gives information, for example, about the combined effect of multipath fading, scattering, Doppler, and power loss of the transmitted signal. Such information may be used by a base station, using channel reciprocity, to estimate the downlink channel quality in different sections of the channel bandwidth and enable uplink frequency selective scheduling to optimize link budget parameters and throughput. There are currently 3 types of SRS transmissions defined by the 3GPP: Single SRS transmissions, Periodic SRS transmissions, and Aperiodic SRS transmissions.

A time interval between signal transmissions due to antenna switching may adversely affect performance of an RF system. For example, under current standards for 5G NR and 4G LTE cellular telephone systems, an SRS transmission may only occur in certain locations of a resource slot (a slot being a sub-unit of a standard radio frame). Due to the need for a time interval between signal transmissions because of antenna switching, in a 1T4R transceiver front end configuration with a sub-carrier spacing (SCS) of 15 kHz, SRS transmissions switched among four different antennas require two slots.

Figure 3:
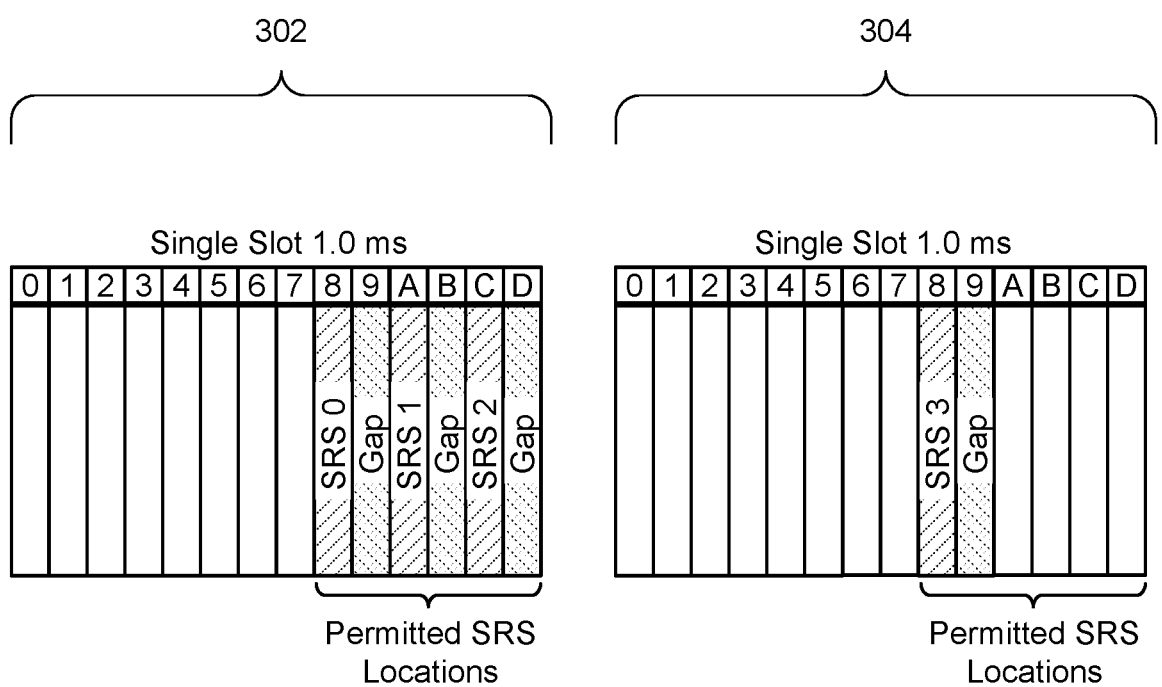
FIG. 3 is a diagram of permitted locations in a resource slot for SRS transmissions in the prior art 5G NR and 4G LTE cellular telephone systems.

FIG. 3 is a diagram of permitted locations in a resource slot for SRS transmissions in the prior art 5G NR and 4G LTE cellular telephone systems. The 3GPP standard allows 14 symbols per slot (slot locations 0 to D, each 1 ms in duration). To accommodate transitions from one antenna to a next antenna, there is one orthogonal frequency-division multiplexing (OFDM) symbol of required separation or gap after each antenna transition. The required guard period or gap per antenna transition allows for RF power to be turned OFF, switching to a next antenna for SRS symbol transmission, and then for RF power to be turned ON (i.e., "cold switching"). Under the 3GPP standard, only the last 6 symbol locations in a slot are permitted to have an SRS transmission. As shown in FIG. 3, locations 8, A, and C of a first slot 302 are available for three SRS transmissions (e.g., SRS0, SRS1, SRS2, corresponding to three different antennas) since associated required guard gaps occupy locations 9, B, and D. Accordingly, a fourth SRS transmission (e.g., SRS3, corresponding to a fourth antenna) is relegated to location 8 of a second slot 304. Because the guard gaps are required in order to "cold switch", current standards are inefficient. As should be clear from FIG. 3, elimination of "cold switching" guard gaps would allow four SRS transmissions within a single slot (e.g., in locations 8-B, or 9-C, or A-D of slot 302).

Figure 4A:
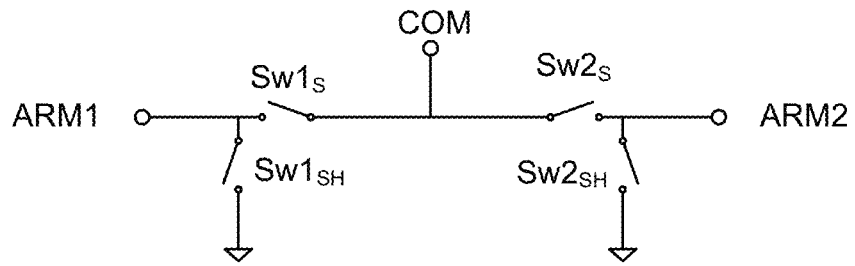
FIG. 4A is a schematic diagram of a prior-art multi-way switching circuit showing two switch arms.

FIG. 4A is a schematic diagram of a prior-art multi-way switching circuit showing two switch arms. In the illustrated example, a common port COM (configured, in this example, to receive an RF signal, such as from a power amplifier) may be selectively coupled to a first associated port ARM1 (in this example, an antenna port) or to a second associated port ARM2 (in this example, also an antenna port). A first serial switch $Sw1_S$ couples the common port COM to the first associated port ARM1 when closed, and a first shunt switch $Sw1_{SH}$ couples the first associated port ARM1 to a reference potential (e.g., circuit ground) when closed. Similarly, a second serial switch $Sw2_S$ couples the common port COM to the second associated port ARM2 when closed, and a second shunt switch $Sw2_{SH}$ couples the second associated port ARM2 to a reference potential when closed. Accordingly, the first switch arm comprises first serial switch $Sw1_S$, first shunt switch $Sw1_{SH}$, and the first associated port ARM1, while the second switch arm comprises second serial switch $Sw2_S$, second shunt switch $Sw2_{SH}$, and the second associated port ARM2. As should be clear, the diagram in FIG. 4A could be extended to include additional switch arms, for example, to accommodate two additional associated ports (e.g., for antennas ANT3 and ANT4).

Figure 4B:
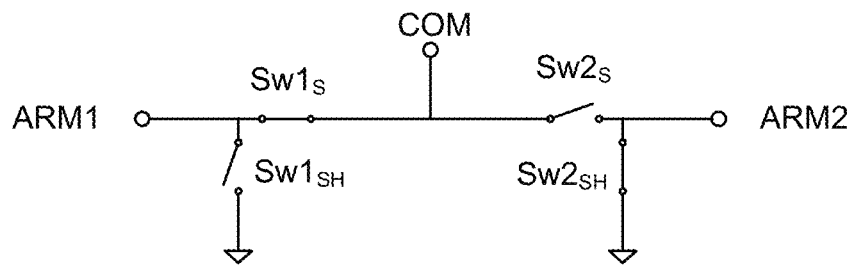
FIG. 4B is a schematic diagram of the prior-art switching circuit of FIG. 4A with the common port COM connected to the first associated port ARM1 and disconnected from the second associated port ARM2.
Figure 4C:
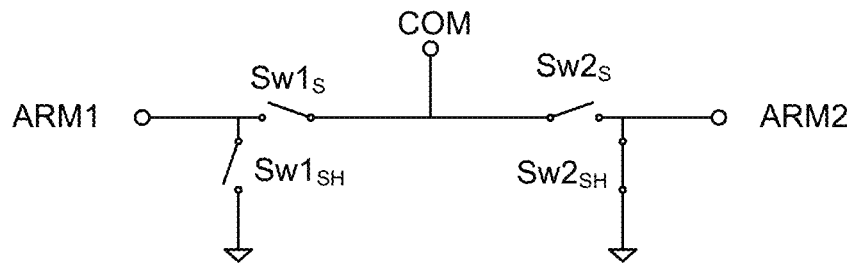
FIG. 4C is a schematic diagram of the prior-art switching circuit of FIG. 4A in a transition state, with the common port COM disconnected from the first and second associated ports ARM1 and ARM2.
Figure 4D:
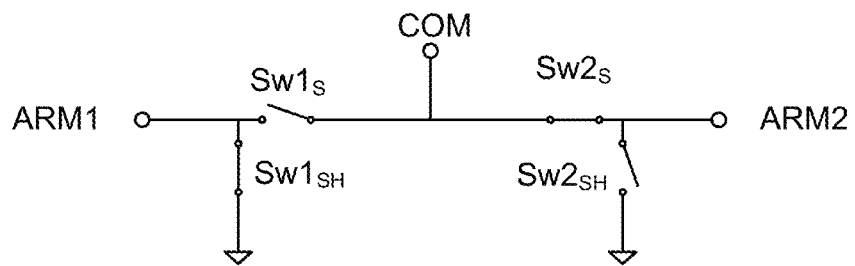
FIG. 4D is a schematic diagram of the prior-art switching circuit of FIG. 4A with the common port COM connected to the second associated port ARM2 and disconnected from the first associated port ARM1.

In FIG. 4A, for general illustration purposes, all switches are open. FIGS. 4B-4C illustrate the potential problems that can arose with such a switch structure if an uncontrolled sequence of switch states is allowed to occur. More specifically: FIG. 4B is a schematic diagram of the prior art switching circuit of FIG. 4A with the common port COM connected to the first associated port ARM1 and disconnected from the second associated port ARM2; FIG. 4C is a schematic diagram of the prior art switching circuit of FIG. 4A in a transition state, with the common port COM disconnected from first and second associated ports ARM1 and ARM2; and FIG. 4D is a schematic diagram of the prior art switching circuit of FIG. 4A with the common port COM connected to the second associated port ARM2 and disconnected from the first associated port ARM1. TABLE 1 below summarizes the sequence of switch states shown in FIGS. 4B-4D.

TABLE 1

| State | FIG. | $Sw1_S$ | $Sw1_{SH}$ | $Sw2_S$ | $Sw2_{SH}$ |
|---|---|---|---|---|---|
| 1 | FIG. 4B | CLOSED | OPEN | OPEN | CLOSED |
| 2 | FIG. 4C | OPEN | OPEN | OPEN | CLOSED |
| 3 | FIG. 4D | OPEN | CLOSED | CLOSED | OPEN |

If RF power is applied to the common port COM while the switches of FIG. 4A are in the state shown in FIG. 4C, there is a concern about reliability degrading due to an uncontrolled state of the switch arms during that transition. With an uncontrolled sequence through the antenna switching transitions, it is likely that an OPEN switch state will occur causing a higher voltage to occur across one or more switch arms. For example, without a properly sequenced transition, serial switch $Sw1_S$ could transition from CLOSED to OPEN (as in FIG. 4C), causing up to twice the normal RF voltage to be imposed across OPEN serial switch $Sw2_S$ since shunt switch $Sw2_{SH}$ is CLOSED. This will stress the second associated port ARM2 switch arm and cause significant harmonic generation at the common port COM. In a different scenario, if shunt switch $Sw1_{SH}$ is CLOSED when serial switch $Sw1_S$ transitions to OPEN, then instead of there being an RF voltage problem, an RF current problem is created: $Sw1_{SH}$=$Sw1_S$=CLOSED=~0 ohms to ground. All of these issues (excess voltage or current in a switch arm and harmonic generation) can upset the SRS transmissions process and degrade reliability. Accordingly, to avoid these problems, the conventional solution has been "cold switching", necessitating that RF power be turned OFF while switching to a next associated port (e.g., a next antenna), and then turning RF power back ON after the switches settle to a new selection state. Such "cold switching" in turn necessitates imposition of a guard gap after each SRS transmission.

Hot Switching Circuit with Terminal Impedance

Figure 5A:
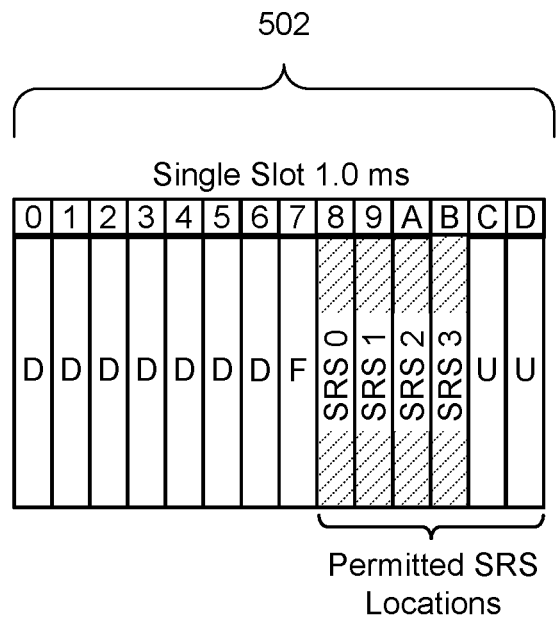
FIG. 5A is a diagram of re-allocated locations in a resource slot for SRS transmissions in the 5G NR and 4G LTE cellular telephone systems enabled by embodiments of the present invention.

A solution to the problems of conventional designs is to provide a switching circuit that supports "hot switching". Such a circuit implements a definitive, well-controlled switch sequence that avoids excess voltage in the switch arms and harmonic generation while speeding up switching transitions. Thus, rather than have a relatively long (e.g., 15 μs) switching transient during which RF power to a switch is OFF, the RF power remains ON during switching. Elimination of the long switching transient enables elimination of the normally required guard gap after each SRS transmission. With such guard gaps removed, in a 1T4R RF transceiver front end configuration, all of the SRS transmissions use only 4 symbols that can be packed into a single slot. For example, FIG. 5A is a diagram of re-allocated locations in a resource slot for SRS transmissions in the 5G NR and 4G LTE cellular telephone systems enabled by embodiments of the present invention. As illustrated, for a 1T4R RF transceiver front end configuration, four SRS transmissions use only 4 symbol locations that may be entirely within a single slot 502.

Figure 5B:
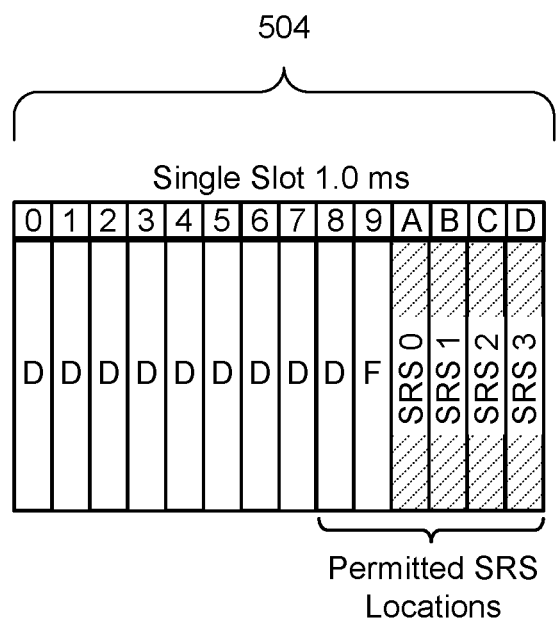
FIG. 5B is a diagram of re-allocated locations in a resource slot for SRS transmissions in a manner that maximizes symbol usage for communication.

As noted above, elimination of "cold switching" guard gaps would allow four SRS transmissions (e.g., SRS0, SRS1, SRS2, SRS3) within a single slot (e.g., in 1 ms duration locations 8-B, or 9-C, or A-D of slot 502). In some embodiments, it may be preferable to use locations A-D to maximize symbol usage for communication. For example, referring to FIG. 5A, locations 0-6 are used for downlink symbols "D" and locations C-D are used for uplink symbols "U". The 3GPP standard requires one or more "flexible" symbols "F" to always be placed between downlink-to-uplink symbol transitions to absorb system timing differences (e.g., signal propagation delays, timing errors)—see, for example, location 7. However, insertion of a flexible symbol "F" is not needed between uplink-to-downlink symbol transitions. The 3GPP standard defines a number of permitted slot location formats, such as all downlink, all uplink, and various mixes of downlink and uplink. Most of the permitted slot location formats start with downlink symbols "D" and finish with uplink symbols "U", thus requiring insertion of a flexible symbol "F". By using locations A-D for the four SRS uplink transmissions, a maximum number of slot locations may be used for downlink symbol transitions. For example, FIG. 5B is a diagram of re-allocated locations in a resource slot 504 for SRS transmissions in a manner that maximizes symbol usage for communication. More specifically, the four SRS transmissions are placed in 1 ms duration locations A-D of slot 504, allowing locations 0-8 to be used for downlink symbol transitions. This slot location usage pattern helps minimize the perturbation to the generalized slot format (downlink locations first, uplink locations last). And in the case of single transmitter, two receiver (1T2R) configurations with only two SRS events, the disturbance may be further reduced. In some embodiments, a throughput improvement of up to about 22.2% can be realized by allocating the SRS transmissions to locations A-D of a resource slot compared to other slot location formats.

Figure 6A:
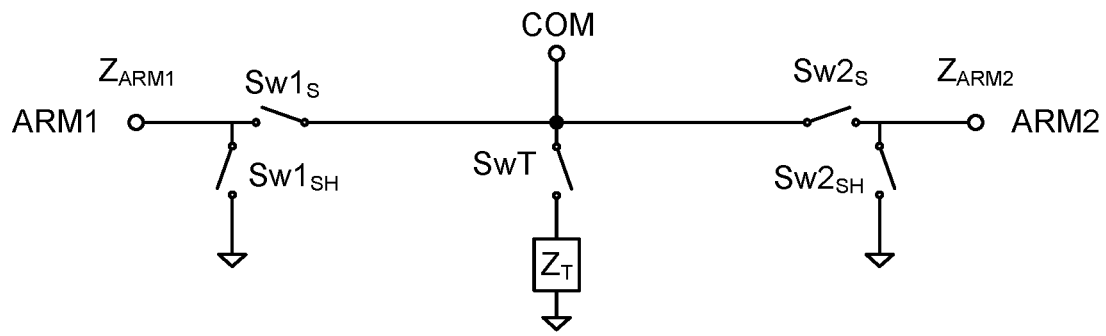
FIG. 6A is a schematic diagram of an improved switching circuit in accordance with the present invention, in a configuration with two switch arms.

FIG. 6A is a schematic diagram of an improved switching circuit in accordance with the present invention, in a configuration with two switch arms. The layout is similar to FIG. 4A, having switch arms for the first and second associated ports ARM1 and ARM2. However, the improved switching circuit of FIG. 6A adds an important element: a shunt termination impedance $Z_T$ couplable to the common port COM through a switch SwT. The impedance $Z_T$ is selectively coupled to the common port COM, and in parallel with a selected first or second associated port ARM1, ARM2, as part of an improved switch transition sequence described below.

In various embodiments, the impedance $Z_T$ may include a resistor, including an adjustable resistor. In other embodiments the impedance $Z_T$ may be a complex impedance. Further, as a practical matter, the switch SwT has an ON resistance $R_{ON}$ that may be considered to be a component of the impedance $Z_T$. Thus, while the effective real impedance represented by $Z_T$ is generally achieved by a combination of $R_{ON}$ and a separate real impedance (such as a resistance), in principle, the entire effective real impedance represented by $Z_T$ can be implemented through just the resistance $R_{ON}$ of the switch SwT if set to a sufficient value. Methods for selecting particularly beneficial values of the impedance $Z_T$ are described further below.

Figure 6B:
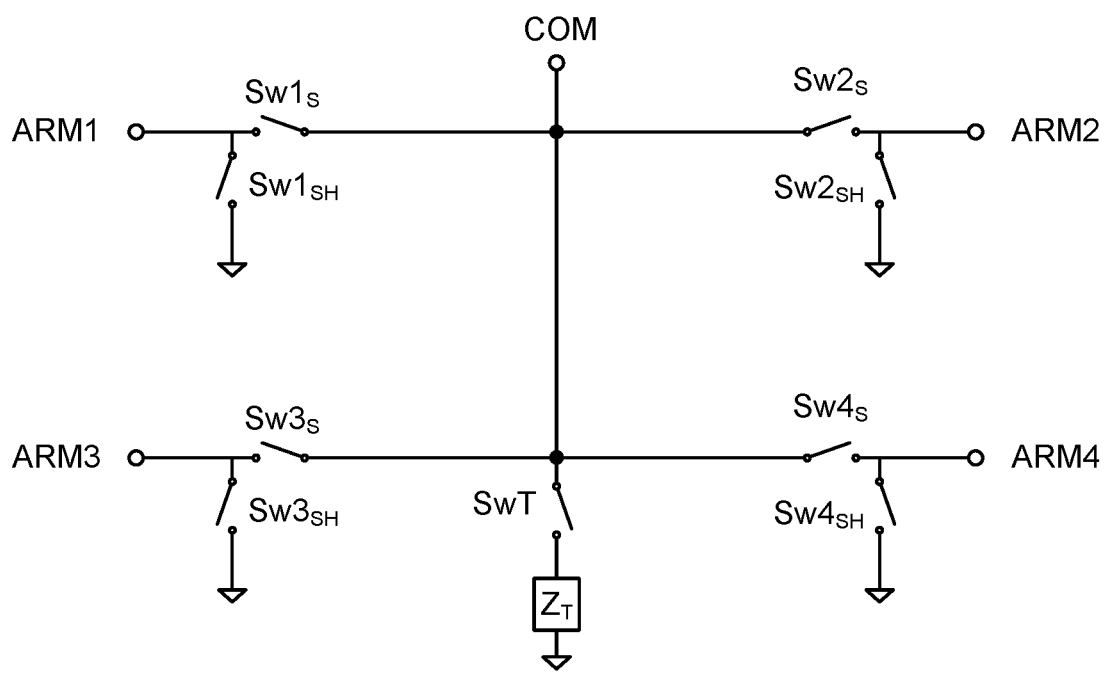
FIG. 6B is a schematic diagram of an improved switching circuit in accordance with the present invention, in a configuration with four switch arms.

FIG. 6B is a schematic diagram of an improved switching circuit in accordance with the present invention, in a configuration with four switch arms, ARM1-ARM4. The layout is similar to FIG. 6A, but adds switch arms ARM3, ARM4 for two additional associated ports, (e.g., for antennas ANT3 and ANT4). Again, a shunt termination impedance $Z_T$ is couplable to the common port COM through a switch $Sw_T$.

In FIGS. 6A and 6B, for general illustration purposes, all switches are open. FIGS. 7A-7E are a sequence of drawings showing the switching circuit of FIG. 6A with the common port COM initially connected to the first associated port ARM1 and disconnected from the second associated port ARM2, and thence transitioning switch states until the common port COM is disconnected from the first associated port ARM1 and connected to the second associated port ARM2 as shown in FIG. 7E. Of note, RF power to the common port COM need not be turned OFF during the transitioning of switch states because of the selective connection of the shunt termination impedance $Z_T$ to the common port COM.

Figure 7A:
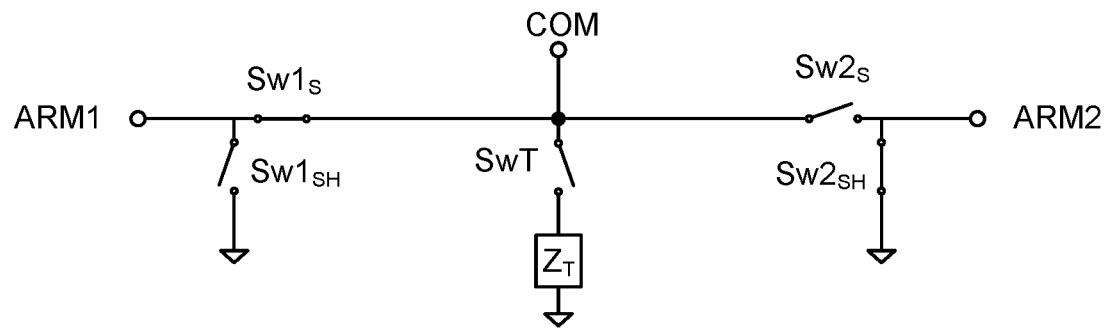
FIG. 7A is a schematic diagram of the switching circuit of FIG. 6A in a first switch state with the common port COM connected to the first associated port ARM1 and disconnected from the second associated port ARM2, with switch SwT OPEN, thus disconnecting the impedance $Z_T$ from the common port COM.
Figure 7B:
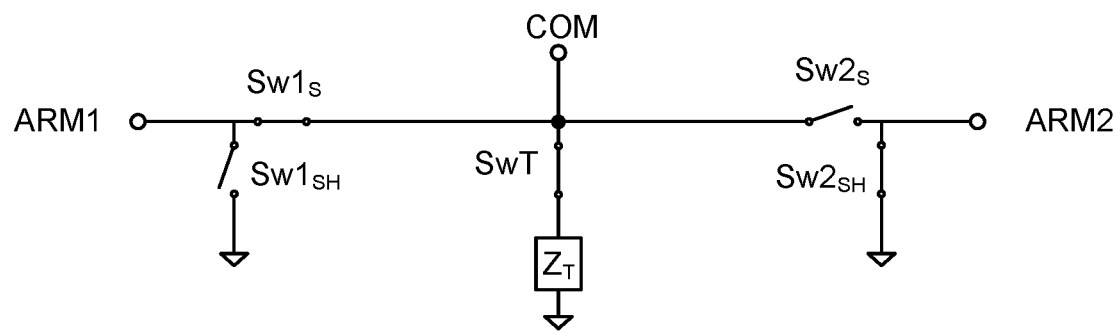
FIG. 7B is a schematic diagram of a second switch state, with the common port COM still connected to the first associated port ARM1 and disconnected from the second associated port ARM2, but with switch SwT CLOSED, thus connecting the impedance $Z_T$ to the common port COM.

In greater detail, FIG. 7A is a schematic diagram of the switching circuit of FIG. 6A in a first switch state with the common port COM connected to the first associated port ARM1 and disconnected from the second associated port ARM2, with switch SwT OPEN, thus disconnecting the impedance $Z_T$ from the common port COM. FIG. 7B is a schematic diagram of a second switch state, with the common port COM still connected to the first associated port ARM1 and disconnected from the second associated port ARM2, but with switch SwT CLOSED, thus connecting the impedance $Z_T$ to the common port COM.

Figure 7C:
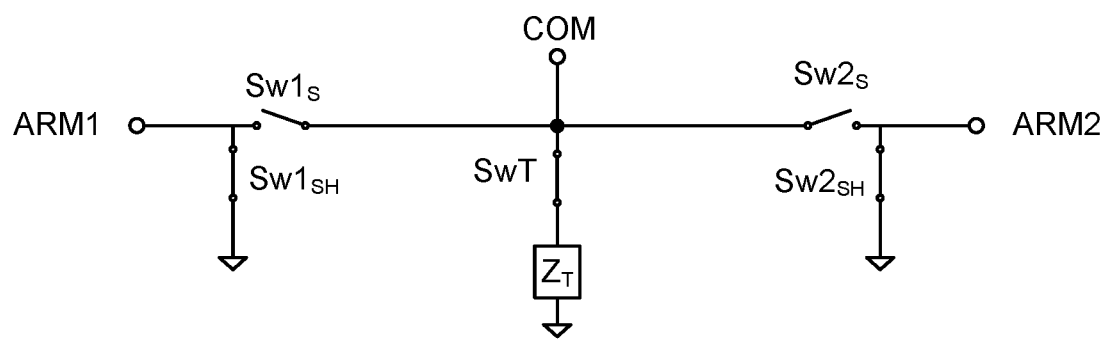
FIG. 7C is a schematic diagram of a third switch state, with the common port COM disconnected from ARM1 and ARM2, with switch SwT still CLOSED.
Figure 7D:
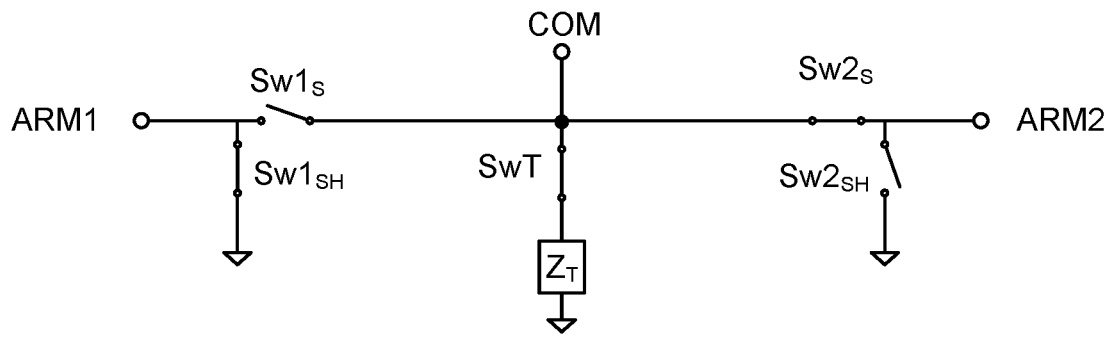
FIG. 7D is a schematic diagram of a fourth switch state, with the common port COM disconnected from ARM1 and connected to ARM2, with switch SwT still CLOSED.
Figure 7E:
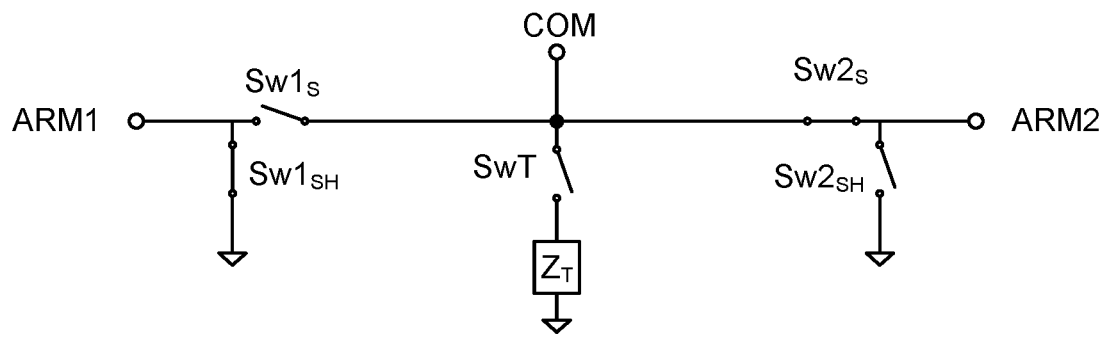
FIG. 7E is a schematic diagram of a fifth switch state with the common port COM disconnected from ARM1 and connected to ARM2, but with switch SwT OPEN.

FIG. 7C is a schematic diagram of a third switch state, with the common port COM disconnected from the first and second associated ports ARM1 and ARM2, with switch SwT still CLOSED. FIG. 7D is a schematic diagram of a fourth switch state, with the common port COM disconnected from the first associated port ARM1 and connected to the second associated port ARM2, with switch SwT still CLOSED.

FIG. 7E is a schematic diagram of a fifth switch state with the common port COM disconnected from the first associated port ARM1 and connected to the second associated port ARM2, but with switch SwT OPEN. TABLE 2 below summarizes the sequence of switch states for FIGS. 7A-7E.

TABLE 2

| State | FIG. | Sw1$_S$ | Sw1$_{SH}$ | SwT | Sw2$_S$ | Sw2$_{SH}$ |
|---|---|---|---|---|---|---|
| 1 | FIG. 7A | CLOSED | OPEN | OPEN | OPEN | CLOSED |
| 2 | FIG. 7B | CLOSED | OPEN | CLOSED | OPEN | CLOSED |
| 3 | FIG. 7C | OPEN | CLOSED | CLOSED | OPEN | CLOSED |
| 4 | FIG. 7D | OPEN | CLOSED | CLOSED | CLOSED | OPEN |
| 5 | FIG. 7E | OPEN | CLOSED | OPEN | CLOSED | OPEN |

Figure 7F:
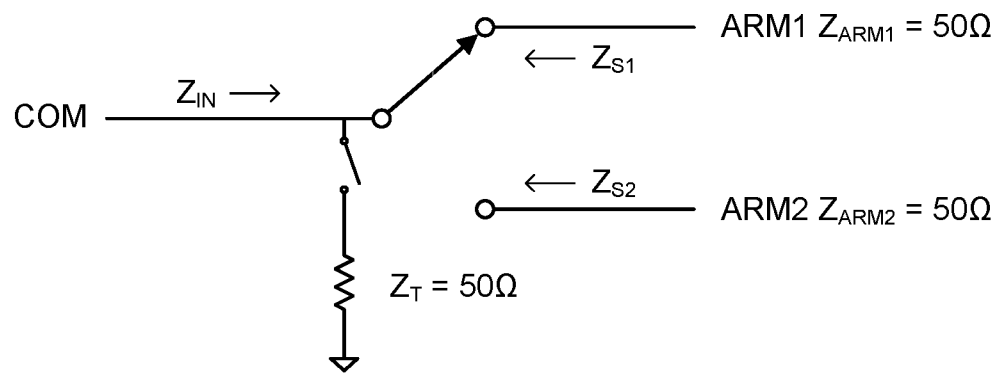
FIG. 7F is an equivalent circuit diagram of the switch of FIG. 7A showing the impedances at each port.

The presence of the impedance $Z_T$ when coupled to the common port COM essentially ensures that the end-to-end impedances of the switch remain controlled with minimal mismatch variation throughout all of the switch transitions. For example, FIG. 7F is an equivalent circuit diagram of the switch of FIG. 7A showing the impedances at each port. It is assumed that the first and second associated ports ARM1 and ARM2 are coupled to respective 50Ω load impedances $Z_{ARM1}$, $Z_{ARM2}$, and that $Z_T$ is also 50Ω. Impedances $Z_{S1}$ and $Z_{S2}$ are the impedances seen when looking into the corresponding switch ports to which ARM1 and ARM2 are respectively connected. The common port COM and its associated input impedance $Z_{IN}$ are the critical port and impedance to control. Switching the impedance $Z_T$ into parallel with either the first associated port ARM1 or the second associated port ARM2 will keep the mismatch loss seen at the common port COM under control and held to a reasonable level (about −10 dB based on the load and impedance assumptions set forth above).

TABLE 3 summarizes the sequence of switch arm states for FIGS. 7A-7E in terms of the ARM1 and ARM2 switch arms being ON or OFF, with resulting impedance values for $Z_{IN}$, $Z_{S1}$, and $Z_{S2}$ when switch arms ARM1 and ARM2, along with the impedance $Z_T$, are disconnected from or connected to the common port COM (again, $Z_T$ is 50Ω).

TABLE 3

| State | FIG. | ARM1 | $Z_T$ | ARM2 | $Z_{IN}$ | $Z_{S1}$ | $Z_{S2}$ |
|---|---|---|---|---|---|---|---|
| 1 | FIG. 7A | ON | OFF | OFF | 50 | 50 | ∞ |
| 2 | FIG. 7B | ON | ON | OFF | 50∥50 | 50∥50 | ∞ |
| 3 | FIG. 7C | OFF | ON | OFF | 50 | ∞ | ∞ |
| 4 | FIG. 7D | OFF | ON | ON | 50∥50 | ∞ | 50∥50 |
| 5 | FIG. 7E | OFF | OFF | ON | 50 | ∞ | 50 |

The sequence of switch arm states shown in TABLES 2 and 3 may be extended to more than two switch arms, and to any transition from one switch arm to another switch arm, so long as the impedance $Z_T$ is coupled to the common port COM during a switching sequence while RF power is passing through the common port COM, especially while all of the serial switches SwX$_S$ are OPEN. This definitive, well-controlled switch sequence avoids excess voltage or current in a switch arm and significant harmonic generation by ensuring that, while the switch circuit is in transition, a reasonable impedance match is maintained on the common port COM, thereby minimizing both voltage and current perturbations seen at the common port during the entire transition. The result is that the addition of switching steps in a manner that avoids degrading reliability while RF power is ON actually decreases the need for any required guard gap after an SRS transmission. With such guard gaps removed, in a 1T4R RF transceiver front end configuration, all of the SRS transmissions uses only 4 symbols that can be packed into a single slot, improving throughput up to about 22.2% in some embodiments.

Figure 8:
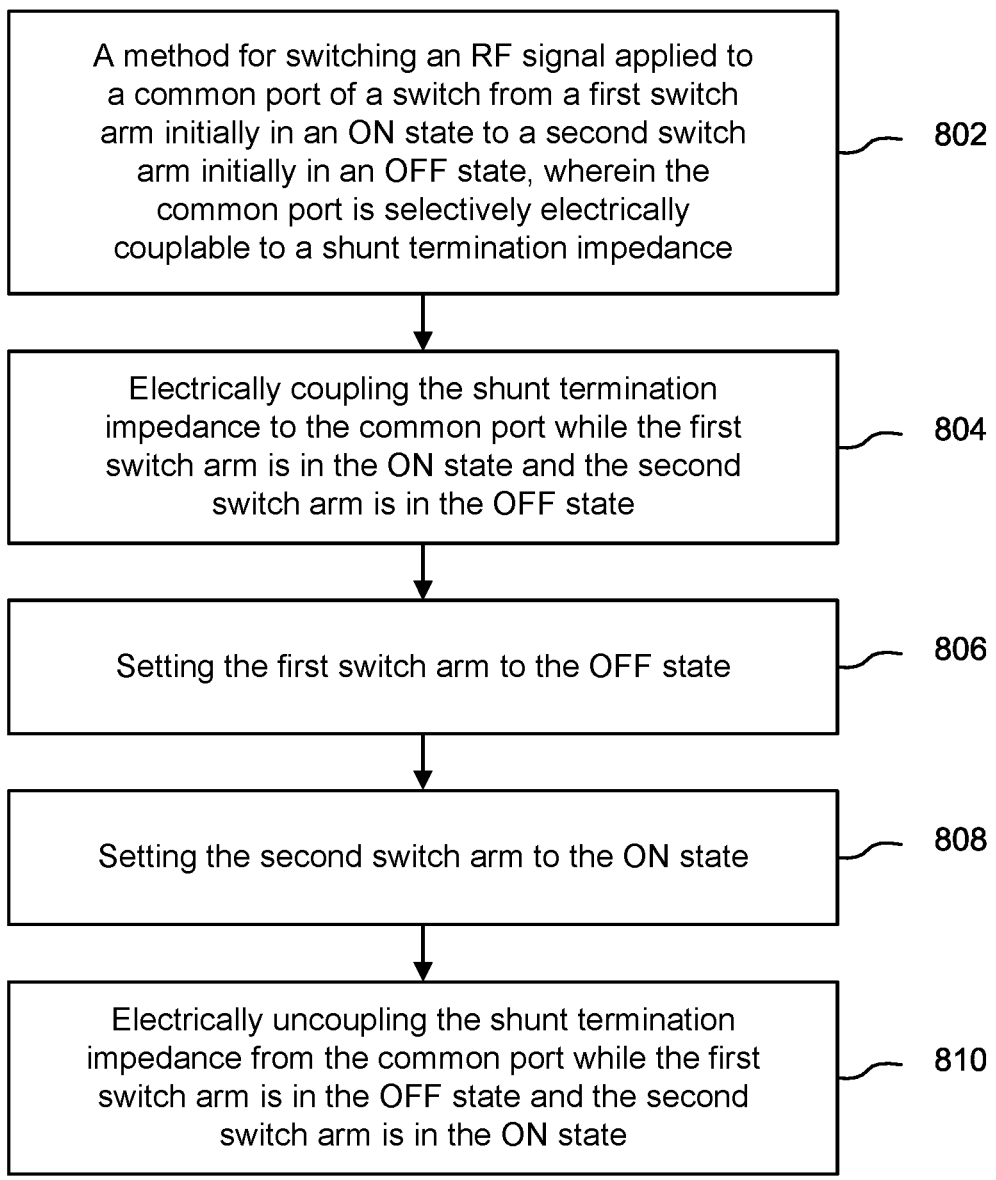
FIG. 8 is a process flowchart showing one method for operating an improved switch in accordance with the present invention.

FIG. 8 is a process flowchart 800 showing one method for operating an improved switch in accordance with the present invention. More specifically, the method is for switching an RF signal applied to a common port of a switch from a first switch arm initially in an ON state to a second switch arm initially in an OFF state, wherein the common port is selectively electrically couplable to a shunt termination impedance [BLOCK 802], including: electrically coupling the shunt termination impedance to the common port while the first switch arm is in the ON state and the second switch arm is in the OFF state [BLOCK 804], then setting the first switch arm to the OFF state [BLOCK 806], then setting the second switch arm to the ON state [BLOCK 808], and then electrically uncoupling the shunt termination impedance from the common port while the first switch arm is in the OFF state and the second switch arm is in the ON state [BLOCK 810].

Determining Optimum $Z_T$ Values

A range of values for the impedance $Z_T$ (which includes the $R_{ON}$ of switch SwT) may be used for various embodiments. However, particularly beneficial values of the impedance $Z_T$ may be determined for specific embodiments by specifying an optimality criterion and iteratively computing values for that criterion for different values of the impedance $Z_T$ until a sufficiently small error relative to the optimal value of the criterion is reached for all transition (intermediate) switch states (i.e., states 2-4 in TABLE 3 above).

Figure 9B:
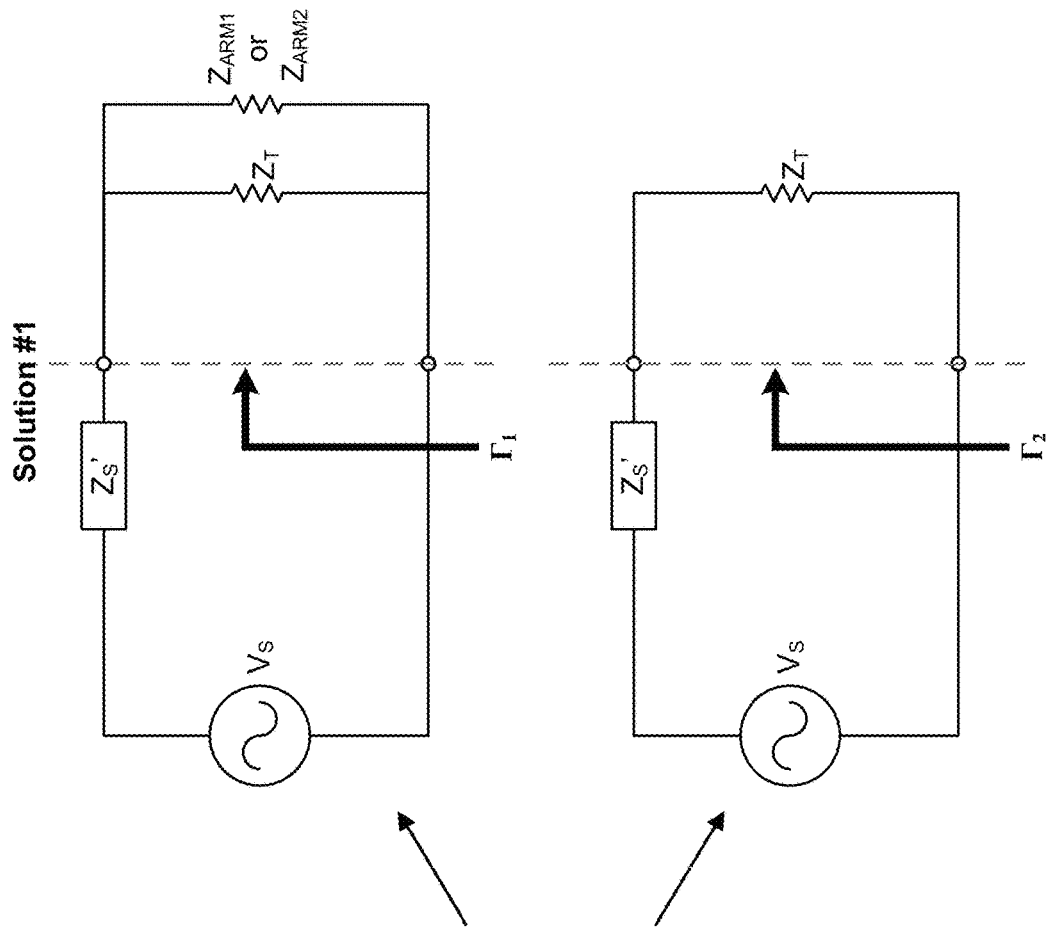
FIG. 9B is a diagram of the equivalent circuits corresponding to Solution #1 and Solution #2 for the different port impedance configurations of a basic embodiment of the present invention.
Figure 9A:
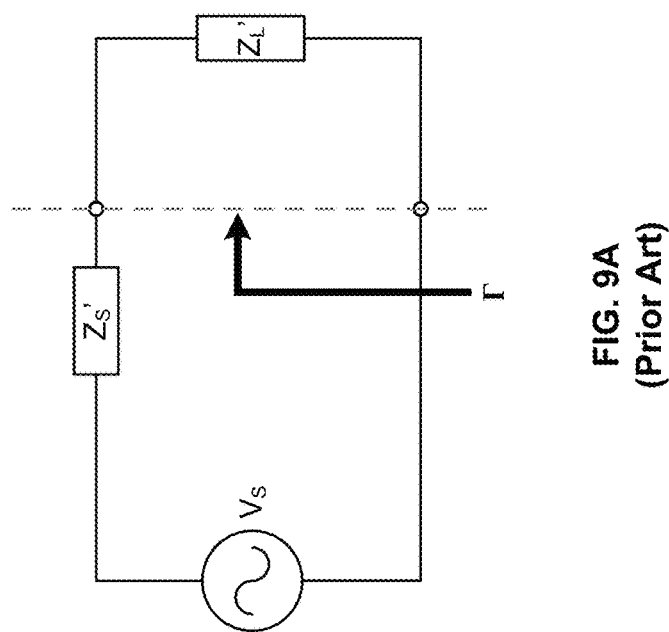
FIG. 9A is a diagram of a prior-art general equivalent circuit for the classic impedance matching problem.

For example, FIG. 9A is a diagram of a prior-art general equivalent circuit for the classic impedance matching problem. A source of electric power $V_S$ (e.g., an RF amplifier) has a source impedance $Z_S'$ equivalent to an electrical resistance in series with a frequency-dependent reactance. A coupled electrical load (e.g., an antenna) has a load impedance $Z_L'$ equivalent to a resistance in series with a reactance. The maximum power theorem states that maximum power is transferred from source to load when the load resistance equals the source resistance and the load reactance equals the negative of the source reactance: the reactances cancel each other out with their opposing dependency on frequency. Another way of saying this using complex valued quantities is that the load impedance must equal the complex conjugate of the source impedance. If this condition is met, the two parts of the circuit (left and right of the connection circles in FIG. 9A) are said to be impedance matched. In a direct current (DC) circuit, the condition is satisfied if the load resistance equals the source resistance. In an alternating current (AC) circuit, the reactance depends on frequency, so circuits which are impedance matched at one frequency may not be impedance matched if the frequency is changed.

One optimality criterion that may be useful is power gain, especially the stability of power gain through the transition states. Referring to FIG. 9A, power gain is dependent upon $Z_L'$ and $Z_S'$. As noted above, maximum power transfer occurs when $Z_L$ equals the complex conjugate of $Z_S$. However, for the real impedance case, $Z_L'=Z_S'$. For different values of $Z_L'$ and $Z_S'$, a measure of the mismatch between $Z_L$ & $Z_S$ can be computed, known as the reflection coefficient Gamma (Γ), which describes how much of a wave is reflected by an impedance discontinuity in the transmission medium. The reflection coefficient may be computed as follows:

$$\Gamma = (Z_L' - Z_S')/(Z_L' + Z_S')$$

From the reflection coefficient, a mismatch loss $ML_{dB}$ may be computed as follows:

$$ML_{dB} = -10 * \log 10(1 - \Gamma^2)$$

If the source impedance $Z_S'$ is kept constant for all switch states, then the value of the load impedance $Z_L'$ can be varied and the power gain computed for the modeled circuit, with the process iterated until a value for the reflection coefficient is attained that provides an acceptable amount of mismatch loss for a particular application. Two solutions exist with the same Gamma magnitude: Solution #1 is for $Z_{L1}'$ (corresponding to the shunt termination impedance $Z_T$ being in parallel with an associated port impedance $Z_{ARM1}$ or $Z_{ARM2}$: $Z_T \| Z_{ARM1}$ or $Z_T \| Z_{ARM2}$), with $Z_{L1}' < Z_S'$, and Solution #2 is for $Z_{L2}$ (corresponding to just the shunt termination impedance $Z_T$), with $Z_{L2}' > Z_S'$. FIG. 9B is a diagram of the equivalent circuits corresponding to Solution #1 and Solution #2 for the different port impedance configurations of a basic embodiment of the present invention.

For the model shown in FIG. 9A, with the source impedance $Z_S'$ held constant, the power gain of the circuit in each switch state may be measured while varying values of the load impedance $Z_L'$ from less than $Z_S'$ and/or from greater than $Z_S'$. The resulting power gain values (in dB) and return loss (in dB) for all switch states for a particular value of the load impedance $Z_L'$ can be compared. As inferred from TABLE 3 and shown in FIG. 9B, there are two distinct switch transition states. Transition states 2 and 4 in TABLE 3 are similar and $Z_{IN}$ at the common port COM is defined as having $Z_T$ in parallel with an associated port impedance, $Z_{ARM1}$ or $Z_{ARM2}$ (see Solution #1 in FIG. 9B). Transition state 3 in TABLE 3 has $Z_{IN}$ defined only by $Z_T$ (see Solution #2 in FIG. 9B). Since $Z_T$ affects the power gain and mismatch loss in all transition states, Z for each transition switch configuration can be determined such that the mismatch loss is at the same minimum across all transition states:

$$\Gamma_1 = (Z_{L1}' - Z_S')/(Z_{L1}' + Z_S'), \text{ where } Z_{L1}' = Z_T \| Z_{ANTx}$$

$$\Gamma_2 = (Z_{L2}' - Z_S')/(Z_{L2}' + Z_S'), \text{ where } Z_{L2}' = Z_T$$

By iteratively varying $Z_T$, the lowest mismatch loss across all transition states can be found and the optimum shunt termination impedance $Z_T$ level determined. In the real resistive case previously described, the optimum $Z_T$ level is approximately 80.9 Ohms. Using a 50 Ohm antenna impedance, the combined $Z_T \| Z_{ARM1}$ or $Z_T \| Z_{ARM2}$ level equates to approximately 30.9 Ohms.

Figure 9C:
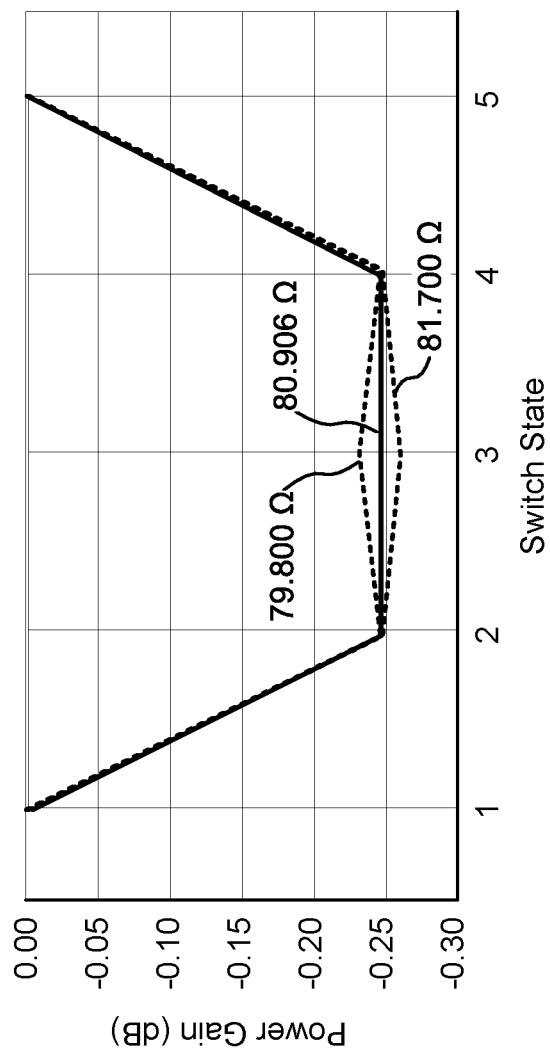
FIG. 9C is a graph showing power gain as a function of transition switch state for three different values of the load impedance $Z_L'$ with respect to a source impedance $Z_S'=50\Omega$.

FIG. 9C is a graph showing power gain as a function of transition switch state for three different values of the load impedance $Z_L'$ with respect to a source impedance $Z_S' = 50\Omega$. Again, the transition switch states are states 2-4 in TABLE 3 above. For end-point switch states 1 and 5, in which the shunt termination impedance $Z_T$ is uncoupled from the common port COM, there is essentially no negative power gain (i.e., no power loss). Transition switch states 2 and 4 correspond to the impedance $Z_T$ being in parallel with one of the associated port impedances $Z_{ARM1}$, $Z_{ARM2}$ and coupled to the common port COM. For transition switch state 3, only the impedance $Z_T$ is coupled to the common port COM.

In the illustrated example, for state 3, the most uniform negative power gain (i.e., the minimum total perturbation or mismatch loss) is at about −0.25 dB when the impedance $Z_{L2}' = Z_T = 80.906\Omega$. TABLE 4 below shows the results of one such iterative process for the model shown in FIG. 9A. An optimality is reached by minimizing the total perturbation and keeping its absolute value steady/uniform (or equalizing it) across the transition states 2-4.

TABLE 4

| States | Eq. Z | $Z_S'$ (Ohms) | $Z_L'$ (Ohms) | Gamma | Gamma (dB) | Mismatch Loss (dB) |
|---|---|---|---|---|---|---|
| 2, 4 | $Z_T \| Z_{Lx}$ | 50 | 30.902 | −0.236 | −12.54 | −0.2490 |
| 3 | $Z_T$ | 50 | 80.906 | 0.236 | −12.54 | −0.2491 |

FIG. 9C also shows the results of selecting effective real impedance values of 79.800Ω and 81.700Ω for the impedance $Z_T$. While the mismatch loss is slightly (less than about 4%) higher or lower for these values in state 3 compared to the value of 80.906Ω, for some applications the level of mismatch loss may still be acceptable to meet an applicable loss specification. For example, the 256QAM error vector magnitude (EVM)—also known as "modulation error"— percentage requirement in the 3GPP specification "Req TS 38.101-1" sets a maximum instantaneous EVM percentage of 3.5%. A mismatch loss of −0.25 dB when the impedance $Z_T = 80.906\Omega$ in embodiments of the present invention approximately corresponds to an instantaneous EVM percentage of less than about 3% (more specifically, 2.84% in this example), well within the 3GPP standard. Thus, the mismatch loss could increase more than 20% (corresponding to an impedance for $Z_T$ within about +5.7% of 80.906Ω (i.e., 85.55Ω) and −13.1% of 80.906Ω (i.e., 70.33Ω)) and still support the 3GPP standard. Accordingly, the process described above for determination of the most beneficial value for the impedance $Z_T$ may be used to compute a range of values for $Z_T$ that are acceptable for a particular application.

While power gain is one optimality criterion, other optimality criterion may be used for determination of a range of acceptable values for the effective real impedance of $Z_T$ with respect to the selected optimality criterion. Upon specifying an optimality criterion, values for that criterion for different values of the impedance $Z_T$ may be iteratively computed until a sufficiently small error relative to the optimal value of the criterion is reached for all transition (intermediate) switch states (i.e., states 2-4 in TABLE 3 above). For example, voltage gain equalization (equalizing $\pm V_{GAIN}$ excursions) or current gain equalization (equalizing $\pm I_{GAIN}$ excursions) may be used to the same effect. For instance, using voltage gain equalization and an exhaustive search of a full data set of voltage gain measurements in dB across for all switch states (i.e., states 1-5 in TABLE 3 above), the difference (delta) between the minimum voltage gain and the maximum voltage gain can be computed for each test value of the impedance $Z_T$. The value of $Z_T$ that gives a delta closest to zero dB, while it stays substantially the same in absolute value across all transition states, is optimum (and of course a value within a range of $Z_T$ values around the optimum may be useful in some applications). For example, using voltage gain equalization as the optimality criterion for the modeled circuit of FIG. 9A, an optimum value of the impedance $Z_T$ is about 89Ω, which provides a maximum voltage gain variation of about −2.15 dB in states 2 and 4 and +2.15 dB in state 3.

Figure 10:
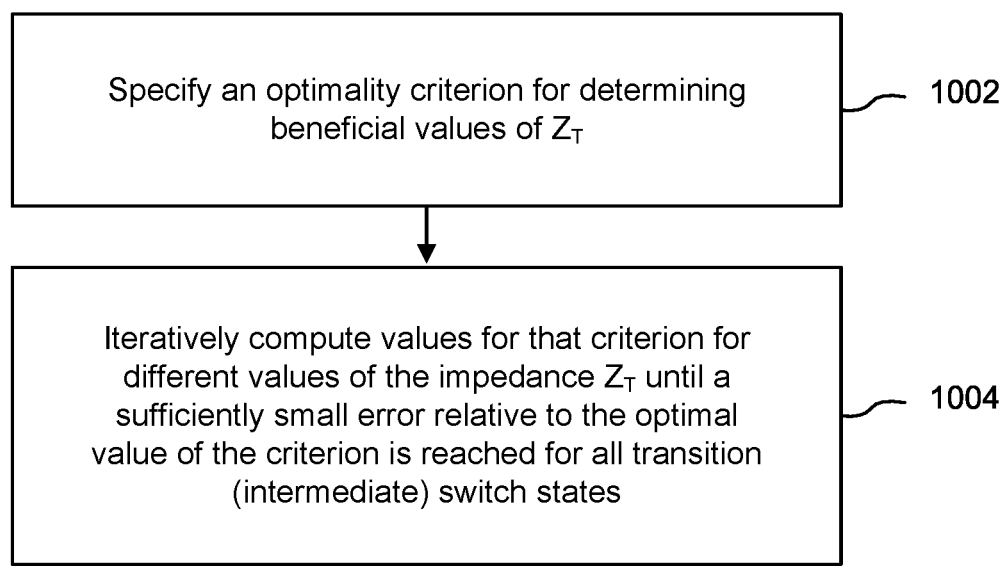
FIG. 10 is a process flowchart showing a general method for determining a beneficial value of the impedance $Z_T$.

FIG. 10 is a process flowchart 1000 showing a general method for determining a beneficial value for the effective real impedance of $Z_T$. First, specify an optimality criterion for determining beneficial values of $Z_T$; examples including power gain, voltage gain equalization, or current gain equalization [BLOCK 1002]. Then, iteratively compute values for that criterion for different values of the impedance $Z_T$ until a sufficiently small error relative to the optimal value of the criterion is reached for all transition (intermediate) switch states [BLOCK 1004].

As should be clear, the improved circuits and methods described above may be applied to other RF transceiver front end configurations, including a single transmitter, two receiver (1T2R) configuration (commonly used for 900 MHz bands) and a 2T4R configuration (like 1T4R, commonly used for mid, high, and ultrahigh bands from 1600-5000 MHz). Further, the beneficial impedance $Z_T$ values given above assume a source impedance and antenna load impedance of 50Ω. In applications that have a different characteristic impedance, the most beneficial impedance $Z_T$ values will be different but may be obtained by the same method shown in FIG. 10.

Switch-Only Hot Switching

In some applications, the level of acceptable mismatch loss may be such that a simpler hot switching method may be used. For example, the 64QAM EVM percentage requirement in the 3GPP specification "Req TS 38.101-1" sets a maximum instantaneous EVM percentage of 8%. For such applications, a hot switching "make-before-break" method may be used that requires no additional components in a switch, but simply just a reconfiguration of the switching sequence.

Figure 11A:
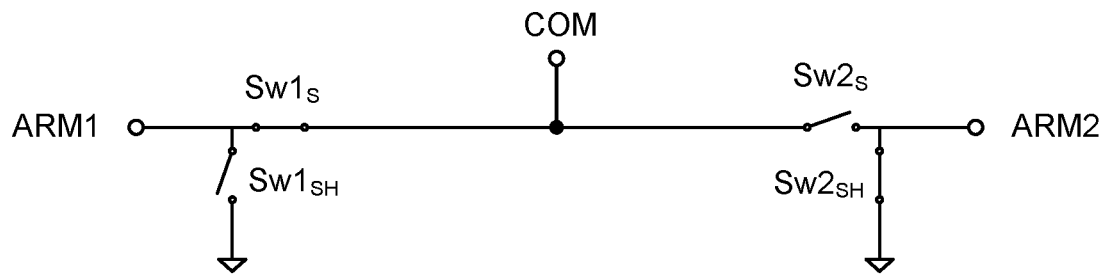
FIG. 11A is a schematic diagram of a two-arm switching circuit with the common port COM connected to the first associated port ARM1 and disconnected from the second associated port ARM2.
Figure 11B:
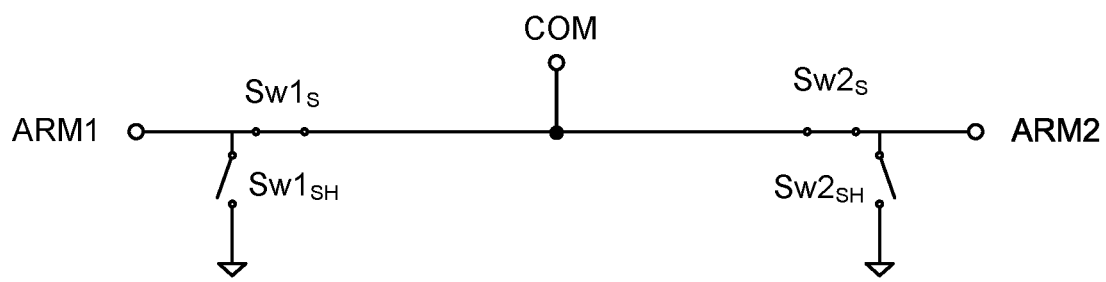
FIG. 11B is a schematic diagram of a first transition state, with the common port COM connected to both the first and second associated ports ARM1 and ARM2.
Figure 11C:
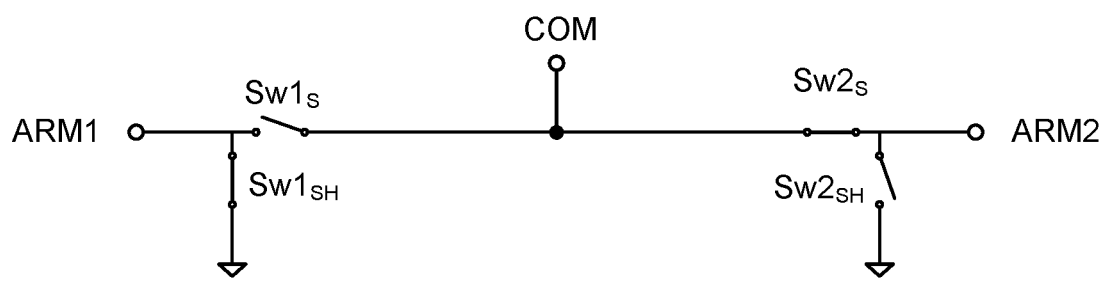
FIG. 11C is a schematic diagram of a second transition state, with the common port COM disconnected from the first associated port ARM1 and connected to the second associated port ARM2.

FIG. 11A is a schematic diagram of a two-arm switching circuit with the common port COM connected to the first associated port ARM1 and disconnected from the second associated port ARM2. FIG. 11B is a schematic diagram of a first transition state, with the common port COM connected to both the first and second associated ports ARM1 and ARM2. FIG. 11C is a schematic diagram of a second transition state, with the common port COM disconnected from the first associated port ARM1 and connected to the second associated port ARM2. Importantly, at all times, at least one load impedance (e.g., 50Ω) is coupled to the common port COM, thereby maintaining control over the impedance level $Z_{IN}$ seen at the common port COM, thus preventing significant harmonic generation and/or excessive voltage or current in a switch arm. TABLE 5 below summarizes the sequence of switch states for FIGS. 11A-11C.

TABLE 5

| State | FIG. | Sw1$_S$ | Sw1$_{SH}$ | Sw2$_S$ | Sw2$_{SH}$ |
|---|---|---|---|---|---|
| 1 | FIG. 11A | CLOSED | OPEN | OPEN | CLOSED |
| 2 | FIG. 11B | CLOSED | OPEN | CLOSED | OPEN |
| 3 | FIG. 11C | OPEN | CLOSED | CLOSED | OPEN |

TABLE 6 summarizes the sequence of switch arm states for FIGS. 11A-11C in terms of the ARM1 and ARM2 switch arms being ON or OFF, with resulting impedance values for $Z_{IN}$, $Z_{S1}$, and $Z_{S2}$ when switch arms ARM1 and ARM2 are disconnected from or connected to the common port COM (see FIG. 7F for the location of the impedance values).

TABLE 6

| State | FIG. | ARM1 | ARM2 | $Z_{IN}$ | $Z_{S1}$ | $Z_{S2}$ |
|---|---|---|---|---|---|---|
| 1 | FIG. 11A | ON | OFF | 50 | 50 | ∞ |
| 2 | FIG. 11D | ON | ON | 50∥50 | 50∥50 | 50∥50 |
| 3 | FIG. 11E | OFF | ON | 50 | ∞ | 50 |

Of note, this switch-only hot switching method requires only 3 sequence states compared to the 5 sequence states of the method associated with the terminal impedance circuit of FIG. 6A. However, if the impedance of the associated port being switched to is assumed to be 50Ω, then the maximum mismatch loss for the switch-only hot switching method based on power gain variation will be about −0.5 dB (with a maximum voltage gain variation of about −3.52 dB), compared to the lower maximum mismatch loss of about −0.25 dB for the method associated with the terminal impedance circuit of FIG. 6A using an optimal or near optimal value for the terminal impedance $Z_T$ (with a maximum voltage gain variation of about −2.15 dB). Nevertheless, a mismatch loss of about −0.5 dB equates to an instantaneous EVM percentage of less than about 6% (more specifically, about 5.6% in this example), which is less than the maximum instantaneous EVM percentage of 8% for the 64QAM EVM percentage requirement in the 3GPP specification noted above.

Figure 12:
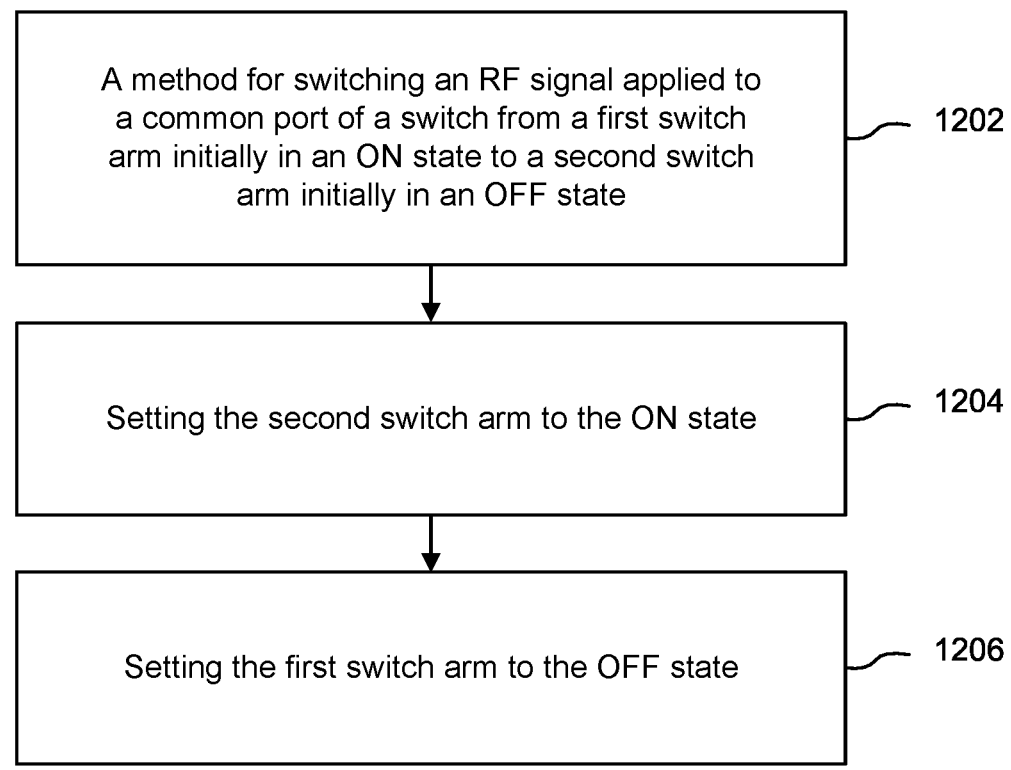
FIG. 12 is a process flowchart showing one method for switch-only hot switching.

FIG. 12 is a process flowchart 1200 showing one method for switch-only hot switching. More specifically, the method is for switching an RF signal applied to a common port of a switch from a first switch arm initially in an ON state to a second switch arm initially in an OFF state [BLOCK 1202], including: setting the second switch arm to the ON state [BLOCK 1204], and then setting the first switch arm to the OFF state [BLOCK 1206].

Circuit Embodiments

While the above examples have generally considered signal flow from the common port COM to the associated ports (e.g., ARM1 or ARM2), the disclosed novel architecture is bidirectional and thus can be used in either transmit a signal from the common port to an associated port, or receive a signal through the common port from an associated port.

Circuits and devices in accordance with the present invention may be used alone or in combination with other components, circuits, and devices. Embodiments of the present invention may be fabricated as integrated circuits (ICs), which may be encased in IC packages and/or in modules for ease of handling, manufacture, and/or improved performance. In particular, IC embodiments of this invention are often used in modules in which one or more of such ICs are combined with other circuit components or blocks (e.g., filters, amplifiers, passive components, and possibly additional ICs) into one package. The ICs and/or modules are then typically combined with other components, often on a printed circuit board, to form part of an end product such as a cellular telephone, laptop computer, or electronic tablet, or to form a higher-level module which may be used in a wide variety of products, such as vehicles, test equipment, medical devices, etc. Through various configurations of modules and assemblies, such ICs typically enable a mode of communication, often wireless communication.

Figure 13:
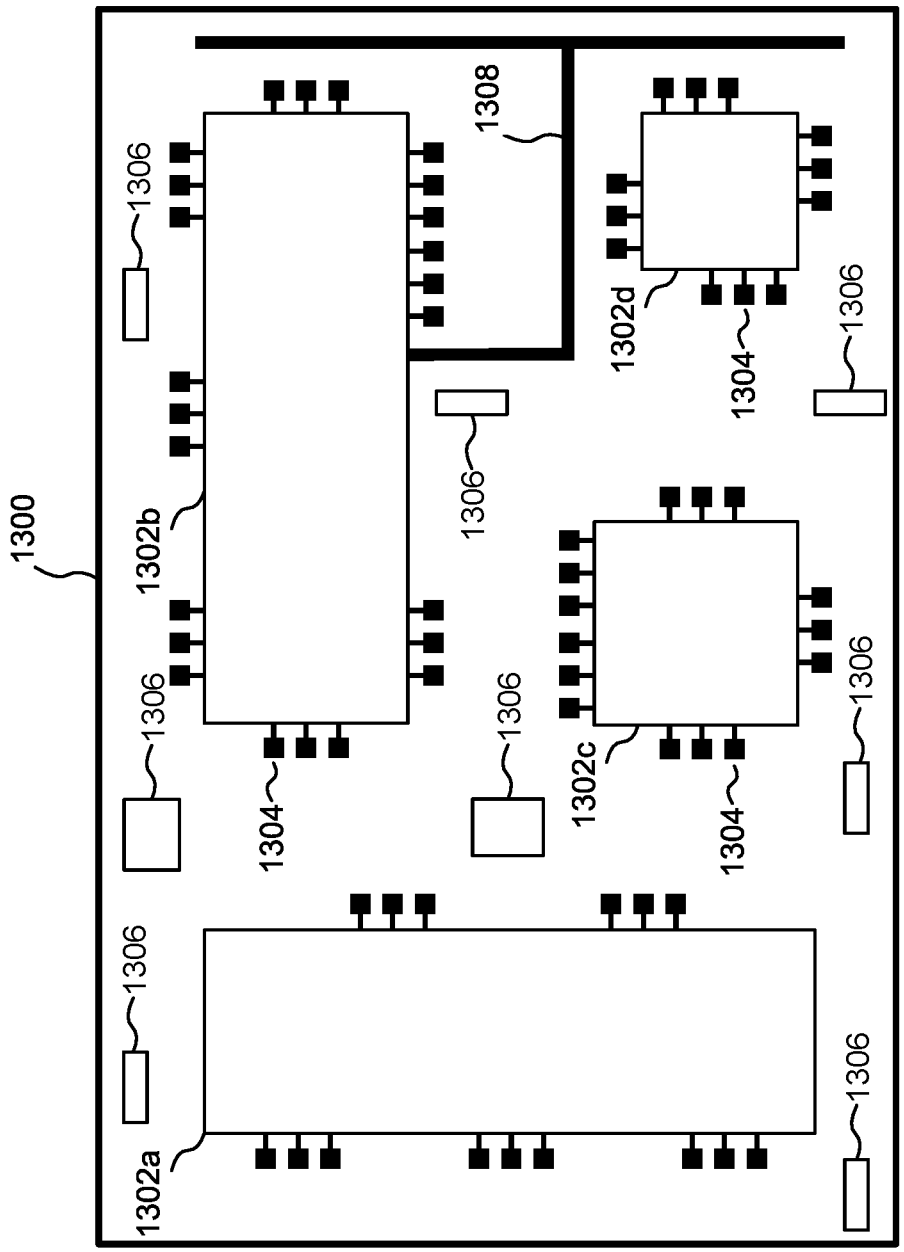
FIG. 13 is a top plan view of a substrate that may be, for example, a printed circuit board or chip module substrate (e.g., a thin-film tile).

As one example of further integration of embodiments of the present invention with other components, FIG. 13 is a top plan view of a substrate 1300 that may be, for example, a printed circuit board or chip module substrate (e.g., a thin-film tile). In the illustrated example, the substrate 1300 includes multiple ICs 1302a-1302d having terminal pads 1304 which would be interconnected by conductive vias and/or traces on and/or within the substrate 1300 or on the opposite (back) surface of the substrate 1300 (to avoid clutter, the surface conductive traces are not shown and not all terminal pads are labelled). The ICs 1302a-1302d may embody, for example, signal switches, active filters, amplifiers (including one or more PA's and/or LNAs), and other circuitry. For example, IC 1302b may incorporate one or more instances of a switch circuit like the circuits shown in FIG. 11A (for switch-only hot switching) and FIG. 6A (for hot switching using a terminal impedance).

The substrate 1300 may also include one or more passive devices 1306 embedded in, formed on, and/or affixed to the substrate 1300. While shown as generic rectangles, the passive devices 1306 may be, for example, filters, capacitors, inductors, transmission lines, resistors, planar antenna elements, transducers (including, for example, MEMS-based transducers, such as accelerometers, gyroscopes, microphones, pressure sensors, etc.), batteries, etc., interconnected by conductive traces on or in the substrate 1300 to other passive devices 1306 and/or the individual ICs 1302a-1302d.

The front or back surface of the substrate 1300 may be used as a location for the formation of other structures. For example, one or more antennas may be formed on or affixed to the front or back surface of the substrate 1300; one example of a front-surface antenna 1308 is shown, coupled to an IC die 1302b, which may include RF front-end circuitry including switch embodiments in accordance with the present invention. Thus, by including one or more antennas on the substrate 1300, a complete radio may be created.

System Aspects

Embodiments of the present invention are useful in a wide variety of larger radio frequency (RF) circuits and systems for performing a range of functions, including (but not limited to) impedance matching circuits, RF power amplifiers, RF low-noise amplifiers (LNAs), phase shifters, attenuators, antenna beam-steering systems, charge pump devices, RF switches, etc. Such functions are useful in a variety of applications, such as radar systems (including phased array and automotive radar systems), radio systems (including cellular radio systems), and test equipment.

Radio system usage includes wireless RF systems (including base stations, relay stations, and hand-held transceivers) that use various technologies and protocols, including various types of orthogonal frequency-division multiplexing ("OFDM"), quadrature amplitude modulation ("QAM"), Code-Division Multiple Access ("CDMA"), Time-Division Multiple Access ("TDMA"), Time and Frequency Division Duplexing ("TDD", "FDD"), Wide Band Code Division Multiple Access ("W-CDMA"), Global System for Mobile Communications ("GSM"), Long Term Evolution ("LTE"), New Radio ("NR"), 5G, 6G, and WiFi (e.g., 802.11a, b, g, ac, ax, be), as well as other radio communication standards and protocols.

Figure 14:
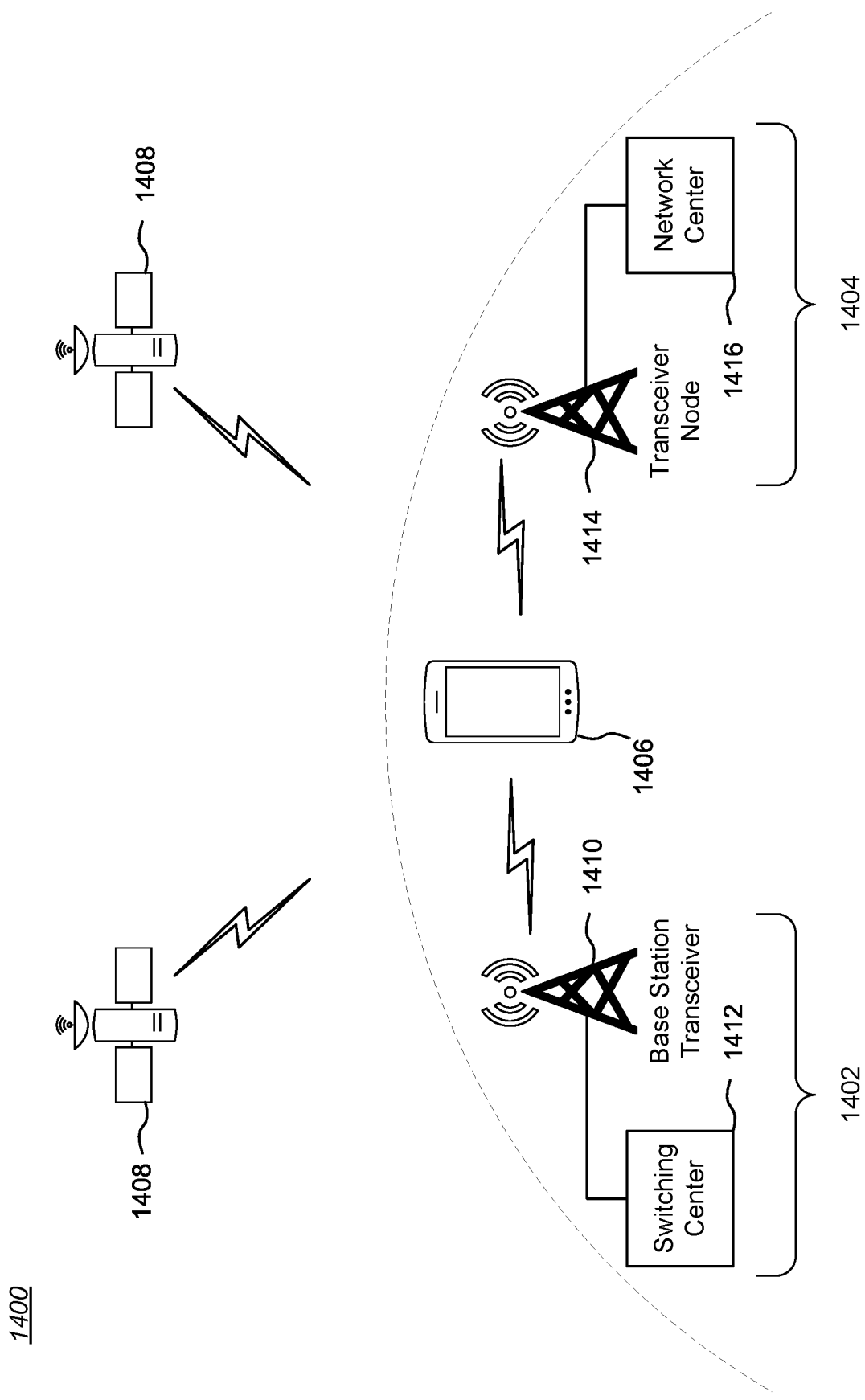
FIG. 14 illustrates an exemplary prior art wireless communication environment comprising different wireless communication systems, and which may include one or more mobile wireless devices.

As an example of wireless RF system usage, FIG. 14 illustrates an exemplary prior art wireless communication environment 1400 comprising different wireless communication systems 1402 and 1404, and which may include one or more mobile wireless devices 1406.

A wireless device 1406 may be capable of communicating with multiple wireless communication systems 1402, 1404 using one or more of the telecommunication protocols noted above. A wireless device 1406 also may be capable of communicating with one or more satellites 1408, such as navigation satellites (e.g., GPS) and/or telecommunication satellites. The wireless device 1406 may be equipped with multiple antennas, externally and/or internally, for operation on different frequencies and/or to provide diversity against deleterious path effects such as fading and multi-path interference. A wireless device 1406 may be a cellular phone, a personal digital assistant (PDA), a wireless-enabled computer or tablet, or some other wireless communication unit or device. A wireless device 1406 may also be referred to as a mobile station, user equipment, an access terminal, or some other terminology.

The wireless system 1402 may be, for example, a CDMA-based system that includes one or more base station transceivers (BSTs) 1410 and at least one switching center (SC) 1412. Each BST 1410 provides over-the-air RF communication for wireless devices 1406 within its coverage area. The SC 1412 couples to one or more BSTs in the wireless system 1402 and provides coordination and control for those BSTs.

The wireless system 1404 may be, for example, a TDMA-based system that includes one or more transceiver nodes 1414 and a network center (NC) 1416. Each transceiver node 1414 provides over-the-air RF communication for wireless devices 1406 within its coverage area. The NC 1416 couples to one or more transceiver nodes 1414 in the wireless system 1404 and provides coordination and control for those transceiver nodes 1414.

In general, each BST 1410 and transceiver node 1414 is a fixed station that provides communication coverage for wireless devices 1406, and may also be referred to as base stations or some other terminology. The SC 1412 and the NC 1416 are network entities that provide coordination and control for the base stations and may also be referred to by other terminologies.

Figure 15:
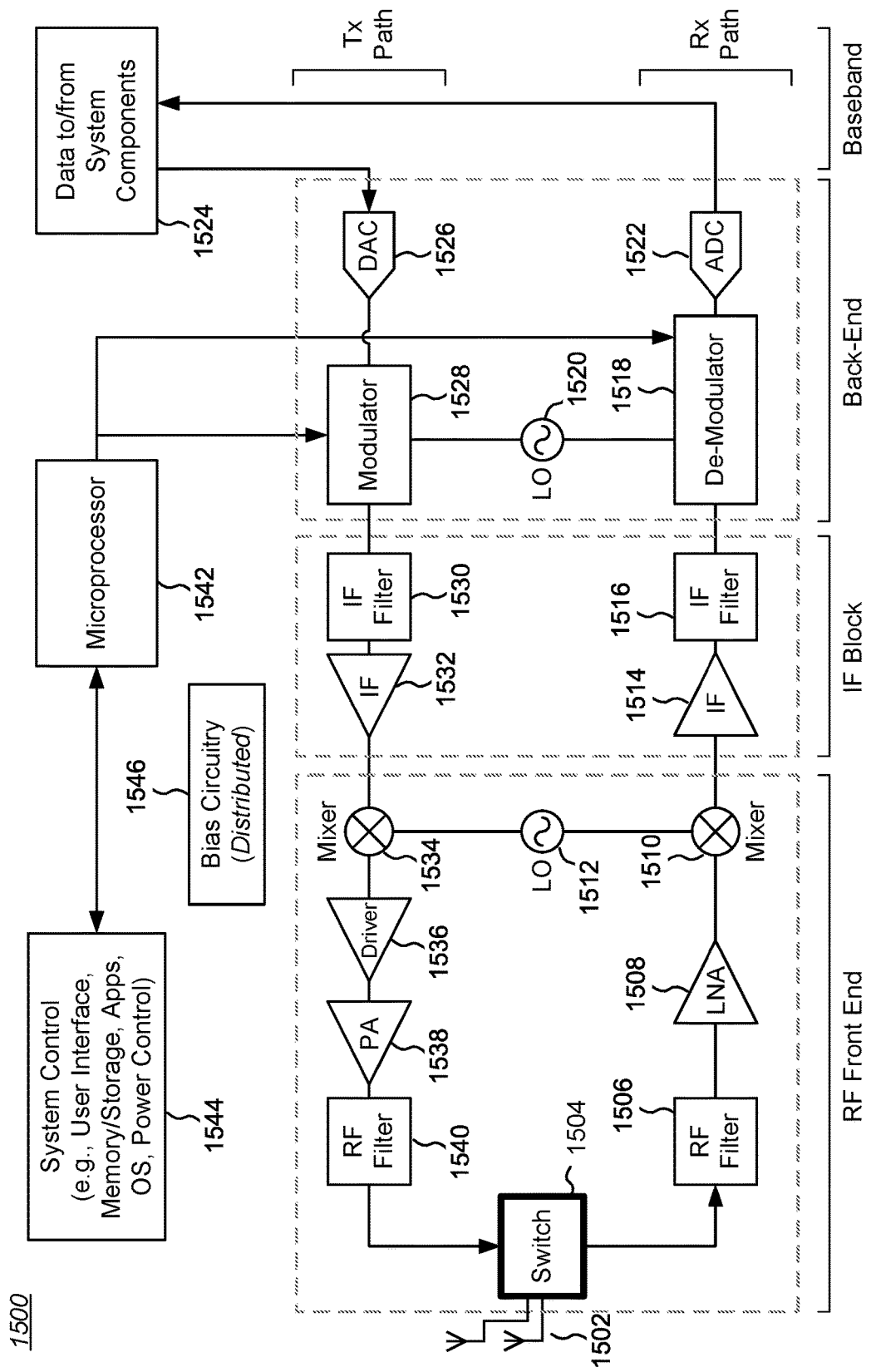
FIG. 15 is a block diagram of a transceiver that might be used in a wireless device, such as a cellular telephone, and which may beneficially incorporate an embodiment of the present invention for improved performance.

An important aspect of any wireless system, including the systems shown in FIG. 14, is in the details of how the component elements of the system perform. FIG. 15 is a block diagram of a transceiver 1500 that might be used in a wireless device, such as a cellular telephone, and which may beneficially incorporate an embodiment of the present invention for improved performance. As illustrated, the transceiver 1500 includes a mix of RF analog circuitry for directly conveying and/or transforming signals on an RF signal path, non-RF analog circuity for operational needs outside of the RF signal path (e.g., for bias voltages and switching signals), and digital circuitry for control and user interface requirements. In this example, a receiver path Rx includes RF Front End, IF Block, Back-End, and Baseband sections (noting that in some implementations, the differentiation between sections may be different).

The receiver path Rx receives over-the-air RF signals through one or more antennas 1502 and a multi-way switching unit 1504, which may be implemented with active switching devices (e.g., field effect transistors or FETs), with devices using phase change materials or MEMS switching devices, and/or with passive devices that implement frequency-domain multiplexing, such as a diplexer or duplexer. The multi-way switching unit 1504 may be, for example, a switch configured and operated in accordance with the present invention.

An RF filter 1506 passes desired received RF signals to a low noise amplifier (LNA) 1508, the output of which is combined in a mixer 1510 with the output of a first local oscillator LO 1512 to produce an intermediate frequency (IF) signal. The IF signal may be amplified by an IF amplifier 1514 and subjected to an IF filter 1516 before being applied to a demodulator 1518, which may be coupled to a second local oscillator LO 1520. The demodulated output of the demodulator 1518 is transformed to a digital signal by an analog-to-digital converter (ADC) 1522 and provided to one or more system components 1524 (e.g., a video graphics circuit, a sound circuit, memory devices, etc.). The converted digital signal may represent, for example, video or still images, sounds, or symbols, such as text or other characters.

In the illustrated example, a transmitter path Tx COM includes Baseband, Back-End, IF Block, and RF Front End sections (again, in some implementations, the differentiation between sections may be different). Digital data from one or more system components 1524 is transformed to an analog signal by a digital-to-analog converter (DAC) 1526, the output of which is applied to a modulator 1528, which also may be coupled to the second local oscillator LO 1520. The modulated output of the modulator 1528 may be subjected to an IF filter 1530 before being amplified by an IF amplifier 1532. The output of the IF amplifier 1532 is then combined in a mixer 1534 with the output of the first local oscillator LO 1512 to produce an RF signal. The RF signal may be amplified by a driver 1536, the output of which is applied to a power amplifier (PA) 1538. The amplified RF signal may be coupled to an RF filter 1540, the output of which is coupled to the antenna(s) 1502 through the multi-way switching unit 1504.

The operation of the transceiver 1500 is controlled by a microprocessor 1542 in known fashion, which interacts with system control 1544 components (e.g., user interfaces, memory/storage devices, application programs, operating system software, power control, etc.). In addition, the transceiver 1500 will generally include other circuitry, such as bias circuitry 1546 (which may be distributed throughout the transceiver 1500 in proximity to transistor devices), electrostatic discharge (ESD) protection circuits, testing circuits (not shown), factory programming interfaces (not shown), etc.

In modern transceivers, there are often more than one receiver path Rx and transmitter path COM, for example, to accommodate multiple frequencies and/or signaling modalities. Further, as should be apparent to one of ordinary skill in the art, some components of the transceiver 1500 may be positioned in a different order (e.g., filters) or omitted. Other components can be (and usually are) added (e.g., additional filters, impedance matching networks, variable phase shifters/attenuators, power dividers, etc.).

Benefits

The current invention enables stable and reliable "hot switching" from one antenna to another in wireless RF systems during at least some transmission events, including SRS transmissions. As a person of ordinary skill in the art will understand, the system architecture is beneficially impacted by the current invention in critical ways, including increased throughput and longer battery life. These system-level improvements are specifically enabled by the current invention since a number of RF standards require or may require strict adherence to time requirements and error parameter values that can only be met by embodiments of the present invention. In order to comply with system standards or customer requirements, the current invention is therefore critical to the overall solution shown in FIG. 15. The current invention therefore specifically defines a system-level embodiment that is creatively enabled by its inclusion in that system.

Fabrication Technologies & Options

Various embodiments of the invention can be implemented to meet a wide variety of specifications. Unless otherwise noted above, selection of suitable component values is a matter of design choice. Various embodiments of the invention may be implemented in any suitable integrated circuit (IC) technology (including but not limited to MOSFET structures), or in hybrid or discrete circuit forms. Integrated circuit embodiments may be fabricated using any suitable substrates and processes, including but not limited to standard bulk silicon, high-resistivity bulk CMOS, silicon-on-insulator (SOI), and silicon-on-sapphire (SOS). Unless otherwise noted above, embodiments of the invention may be implemented in other transistor technologies such as bipolar, BiCMOS, LDMOS, BCD, InP, PIN diode, GaAs HBT, GaN HEMT, GaAs pHEMT, and MESFET technologies. However, embodiments of the invention are particularly useful when fabricated using an SOI or SOS based process, or when fabricated with processes having similar characteristics. Fabrication in CMOS using SOI or SOS processes enables circuits with low power consumption, the ability to withstand high power signals during operation due to FET stacking, good linearity, and high frequency operation (i.e., radio frequencies up to and exceeding 300 GHz). Monolithic IC implementation is particularly useful since parasitic capacitances generally can be kept low (or at a minimum, kept uniform across all units, permitting them to be compensated) by careful design.

The term "MOSFET", as used in this disclosure, includes any field effect transistor (FET) having an insulated gate whose voltage determines the conductivity of the transistor, and encompasses insulated gates having a metal or metal-like, insulator, and/or semiconductor structure. The terms "metal" or "metal-like" include at least one electrically conductive material (such as aluminum, copper, or other metal, or highly doped polysilicon, graphene, or other electrical conductor), "insulator" includes at least one insulating material (such as silicon oxide or other dielectric material), and "semiconductor" includes at least one semiconductor material.

A circuit or circuit component that is characterized as "adjustable" may have its value selected from a number of possible component value settings and fixed during fabrication, when assembled in a circuit module, during factory testing, or in the field (e.g., by burning or "blowing" fusible links), or may have its value be dynamically varied, tuned, or programmatically set, such as in response to other circuitry (e.g., temperature compensation circuitry) or in response to generated or received command signals.

As used in this disclosure, the term "radio frequency" (RF) refers to a rate of oscillation in the range of about 3 kHz to about 300 GHz. This term also includes the frequencies used in wireless communication systems. An RF frequency may be the frequency of an electromagnetic wave or of an alternating voltage or current in a circuit.

Voltage levels may be adjusted, and/or voltage and/or logic signal polarities reversed, depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functionality without significantly altering the functionality of the disclosed circuits.

With respect to the figures referenced in this disclosure, the dimensions for the various elements are not to scale; some dimensions have been greatly exaggerated vertically and/or horizontally for clarity or emphasis. In addition, references to orientations and directions (e.g., "before", "after", "top", "bottom", "above", "below", "lateral", "vertical", "horizontal", etc.) are relative to the example drawings, and not necessarily absolute orientations or directions.

CONCLUSION

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, and/or parallel fashion.

It is to be understood that the foregoing description is intended to illustrate and not to limit the scope of the invention, which is defined by the scope of the following claims, and that other embodiments are within the scope of the claims. In particular, the scope of the invention includes any and all feasible combinations of one or more of the processes, machines, manufactures, or compositions of matter set forth in the claims below. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

What is claimed is:

1. A method for switching an RF signal applied to a common port of a switch circuit from a first switch arm initially in an ON state to a second switch arm initially in an OFF state, the method including:
   (a) setting the second switch arm to the ON state; and
   (b) then setting the first switch arm to the OFF state;
   wherein the first switch arm and the second switch arm each include a respective serial switch coupled between the common port and corresponding associated port, and one or more of the first switch arm and the second switch arm includes a respective shunt switch coupled to the corresponding associated port and configured to be coupled to a reference potential.

2. The method of claim 1, wherein the method results in a modulation error less than about 6%.

3. The method of claim 1, wherein the method results in a mismatch loss less than or equal to about −0.5 dB.

4. A radio frequency (RF) switch circuit including:
   (a) a common port configured to pass an RF signal;
   (b) a plurality of switch arms each coupled to the common port and including an associated port; and
   (c) a shunt termination impedance selectively electrically couplable to the common port through a switch;
   wherein the shunt termination impedance is coupled by the switch to the common port (1) before a first switch arm of the plurality of switch arms transitions from an ON state to an OFF state while the remaining switch arms of the plurality of switch arms are in the OFF state, (2) while the first switch arm of the plurality of switch arms transitions to the OFF state while the remaining switch arms of the plurality of switch arms are in the OFF state, and (3) while a second switch arm of the plurality of switch arms transitions from the OFF state to the ON state while the first switch arm of the plurality of switch arms is in the OFF state; and
   wherein the shunt termination impedance is otherwise electrically disconnected from the common port.

5. The invention of claim 4, wherein the shunt termination impedance includes a resistor.

6. The invention of claim 4, wherein an effective real impedance of the switch and the shunt termination impedance has a value within about +5.7% above and about −13.1% below about 80.9 ohms.

7. The invention of claim 4, wherein an effective real impedance of the switch and the shunt termination impedance has a value that results in a modulation error less than about 3%.

8. The invention of claim 4, wherein an effective real impedance of the switch and the shunt termination impedance has a value that results in a mismatch loss less than or equal to about −0.25 dB.

9. The invention of claim 4, wherein each switch arm of the plurality of switch arms includes a respective serial switch coupled between the common port and the associated port, and one or more switch arms of the plurality of switch arms includes a respective shunt switch coupled to the associated port and configured to be coupled to a reference potential.

10. A method for switching a radio frequency signal applied to a common port of a switch from a first switch arm initially in an ON state to a second switch arm initially in an OFF state, wherein the common port is selectively electrically couplable to a shunt termination impedance through a connection switch, the method including:
   (a) electrically coupling the shunt termination impedance through the connection switch to the common port while the first switch arm is in the ON state and the second switch arm is in the OFF state;
   (b) then setting the first switch arm to the OFF state;
   (c) then setting the second switch arm to the ON state; and
   (d) then electrically uncoupling the shunt termination impedance from the common port while the first switch arm is in the OFF state and the second switch arm is in the ON state.

11. The method of claim 10, wherein the shunt termination impedance includes a resistor.

12. The method of claim 10, wherein an effective real impedance of the switch and the shunt termination impedance has a value within about +5.7% above and about −13.1% below about 80.9 ohms.

13. The method of claim 10, wherein an effective real impedance of the switch and the shunt termination impedance has a value that results in a modulation error less than about 3%.

14. The method of claim 10, wherein an effective real impedance of the switch and the shunt termination impedance has a value that results in a mismatch loss less than or equal to about −0.25 dB.

15. The method of claim 10, wherein the first switch arm and the second switch arm each include a respective serial switch coupled between the common port and a corresponding associated port, and one or more of the first switch arm and the second switch arm includes a respective shunt switch coupled to the corresponding associated port and configured to be coupled to a reference potential.

\* \* \* \* \*